(12) United States Patent
Palma Guerrero, Jr.

(10) Patent No.: US 11,964,198 B2
(45) Date of Patent: Apr. 23, 2024

(54) DIRECTIONAL PAD ASSEMBLY AND HANDHELD CONTROLLER

(71) Applicant: Razer (Asia-Pacific) Pte. Ltd., Singapore (SG)

(72) Inventor: Gil Palma Guerrero, Jr., Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/265,147

(22) PCT Filed: Dec. 17, 2020

(86) PCT No.: PCT/SG2020/050760
§ 371 (c)(1),
(2) Date: Jun. 2, 2023

(87) PCT Pub. No.: WO2022/132029
PCT Pub. Date: Jun. 23, 2022

(65) Prior Publication Data
US 2023/0398439 A1    Dec. 14, 2023

(51) Int. Cl.
*A63F 13/24* (2014.01)
(52) U.S. Cl.
CPC .................................. *A63F 13/24* (2014.09)
(58) Field of Classification Search
CPC ...................................................... A63F 13/24
See application file for complete search history.

(56) References Cited

U.S. PATENT DOCUMENTS 6,563,487 B2 * 5/2003 Martin .................... A63F 13/24
345/156
7,283,125 B2  10/2007 Martinez et al.
(Continued)

FOREIGN PATENT DOCUMENTS

CN    1124855 A    6/1996
CN    2778350 Y    5/2006
(Continued)

OTHER PUBLICATIONS

ISR/WO issued for corresponding International Application No. PCT/SG2020/050760 (4 pages).
(Continued)

*Primary Examiner* — Peter J Iannuzzi
(74) *Attorney, Agent, or Firm* — Polsinelli PC

(57) ABSTRACT

A directional pad assembly including a directional-control unit having a plate-like structure and two or more plunger elements slidable relative to the plate-like structure; a main support structure to support a centre of the plate-like structure such that the plate-like structure is multi-directional tiltable; an interface frame structure suspended above the plate-like structure of the directional-control unit and in a fixed spatial relationship and non-movable relative to the main support structure; and two or more switches arranged around the main support structure and aligned to the two or more plunger elements. The directional-control unit being operable between a first mode, whereby the plate-like structure is tiltable, and a second mode, whereby the two or more plunger elements are individually slidable relative to the plate-like structure, to activate the two or more switches.

21 Claims, 12 Drawing Sheets

(56) References Cited

U.S. PATENT DOCUMENTS

| | | | |
|---|---|---|---|
| 9,868,058 B2 | 1/2018 | Gassoway et al. | |
| 9,908,041 B2 | 3/2018 | Kujawski et al. | |
| 10,124,249 B2 | 11/2018 | Schmitz et al. | |
| 10,130,874 B2 | 11/2018 | Schmitz et al. | |
| 10,137,364 B2 | 11/2018 | Schmitz | |
| 10,427,037 B2 | 10/2019 | Strahle et al. | |
| 10,543,427 B2 | 1/2020 | Miller | |
| 10,780,343 B2* | 9/2020 | Chou | A63F 13/98 |
| 2003/0030619 A1 | 2/2003 | Martin et al. | |
| 2005/0215321 A1 | 9/2005 | Hussaini et al. | |
| 2016/0317921 A1* | 11/2016 | Schmitz | A63F 13/23 |
| 2019/0060746 A1* | 2/2019 | Ironmonger | A63F 13/24 |

FOREIGN PATENT DOCUMENTS

| | | |
|---|---|---|
| CN | 102091418 A | 6/2011 |
| CN | 107405523 A | 11/2017 |
| CN | 107580520 A | 1/2018 |
| CN | 107743412 B | 2/2018 |
| CN | 110461428 A | 11/2019 |
| JP | 2012-204069 A | 10/2012 |
| JP | 6005112 B2 | 10/2016 |
| KR | 101566444 B1 | 11/2015 |
| WO | 2005/110568 A2 | 11/2005 |

OTHER PUBLICATIONS

3in1 Metal Magnetic D-Pad Button Replacement for XBOX One and X1 Elite Controller (http://www.westingames.com/3in1-Metal-Magnetic-D-Pad-Button-Replacement-for-XBOX-ONE-and-X1-Elite-Controller-WRXON101_5999.html); (2 pages).
Chinese first office action report; dated Oct. 26, 2023; application #202080107996.X.

* cited by examiner

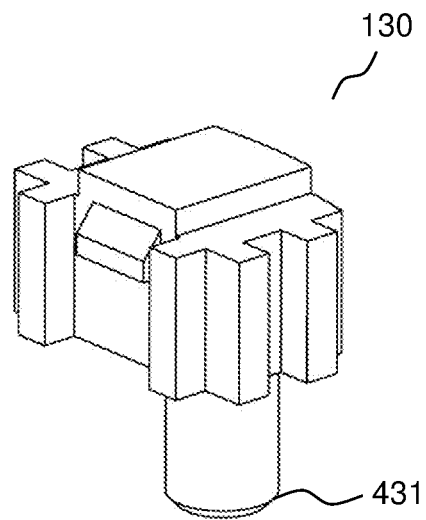
FIG. 7A
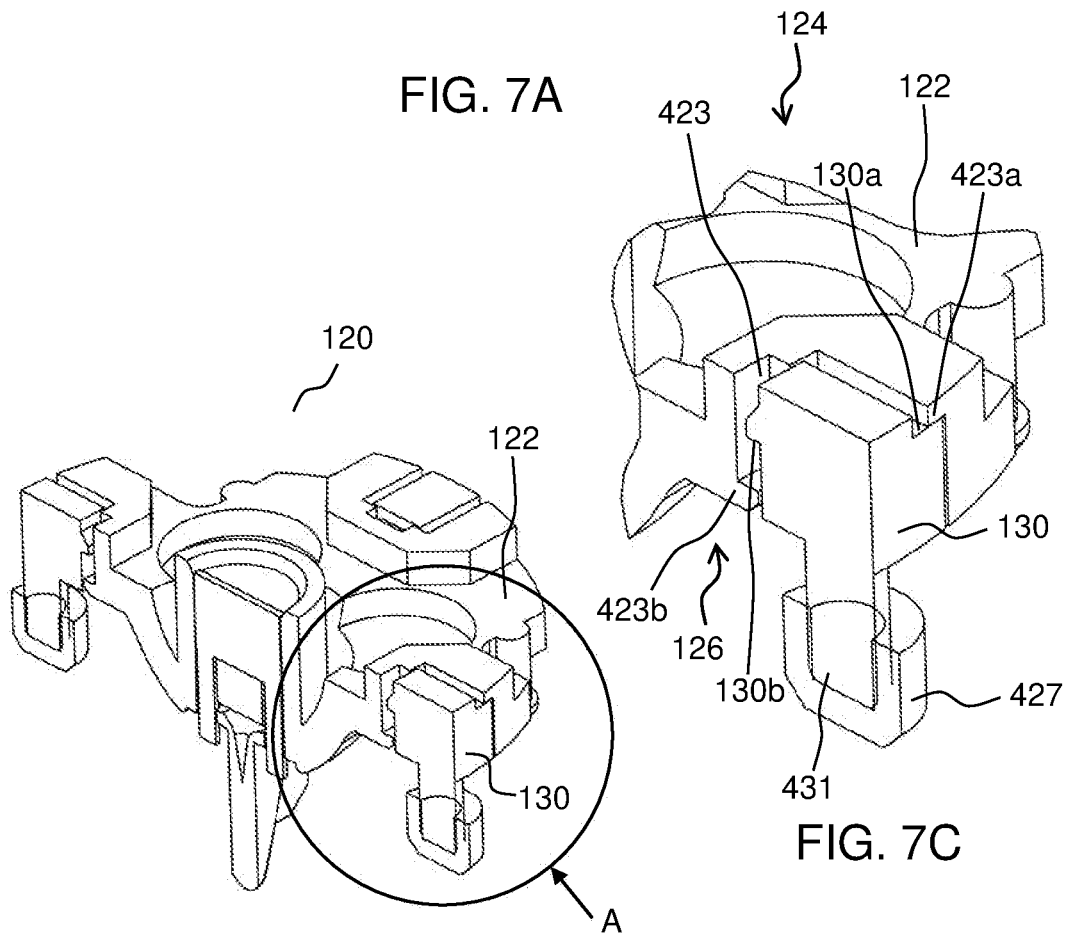
FIG. 7B
FIG. 7C

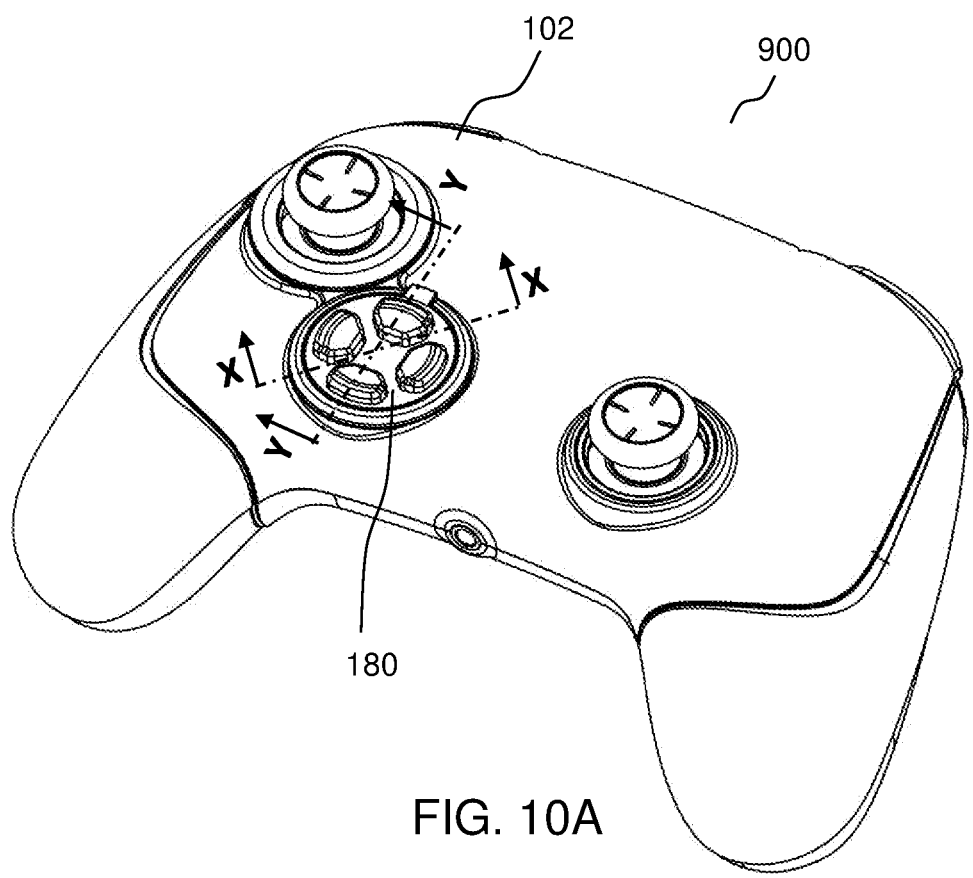
FIG. 10A
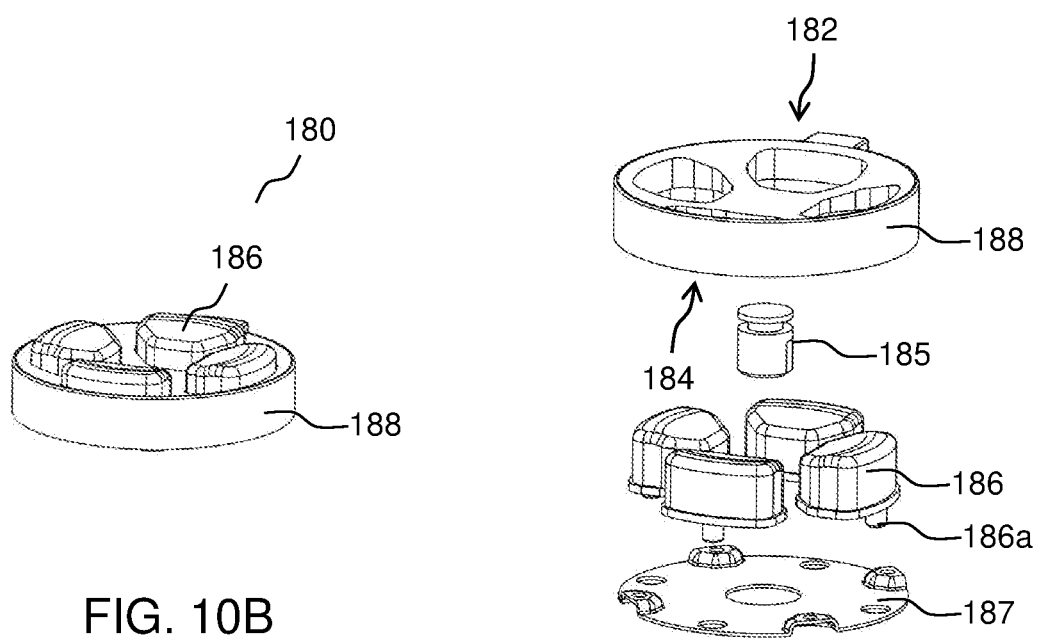
FIG. 10B
FIG. 10C

DIRECTIONAL PAD ASSEMBLY AND HANDHELD CONTROLLER

TECHNICAL FIELD

Various embodiments generally relate to a directional pad assembly and a handheld controller. In particular, various embodiments generally relate to a directional pad assembly for a directional pad (or a D-pad) of a handheld controller, and a handheld controller having the directional pad assembly.

BACKGROUND

In the market, a lot of handheld gaming controller tries to offer customization as the gaming industry begins to understand how games are played and what sort of hardware is suitable for a particular game. One particular feature that most handheld gaming controller has with potential for customization is the D-pad (or the directional pad). Generally, games can be classified into various categories including, but not limited to, fighting games, shooting game (FPS), or racing games.

For a fighting games, a swivel D-pad is the most sort-after because almost all fighting games generally require buttons combinations (or combo) which most of the time is executed with the use of D-pad. These buttons combinations usually involve rolling over between 2 to 3 directions (for example a diagonal combination of two buttons successively in a quick manner) to execute a power up combo or a fighting technique. Typically, these combinations of 2 to 3 buttons are required to be executed within a few milliseconds for the game to recognize such command is for a certain power up or special fighting techniques. Due to the requirement that the buttons have to be pressed within a short timeframe, a user generally prefers a very smooth sliding D-pad with good feedback for ease of executing such special game techniques. Hence the swivel D-pad is generally preferred by the user when playing fighting games.

For shooting games and driving games, precision in direction is generally required because accidental pressing of two or more buttons in combination (for example pressing a diagonal combination of two buttons successively in a quick manner) could mean a miss in position when trying to aim for an enemy while moving in shooting games or an unintentional swerving in driving games. Accordingly, the user generally prefers an individual button for each direction so as to have better control when playing the shooting games or the driving games. Hence, a discrete D-pad having individual buttons for each direction is generally preferred by the user when playing the shooting games or the driving games.

However, conventional handheld gaming controllers generally only has one type or D-pad. Thus, the user will have to own several different controllers so as to switch between different controllers for different types of game.

Accordingly, there is a need for a more effective and versatile solution to address the above issues.

SUMMARY

According to various embodiments, there is provided a directional pad assembly. The directional pad assembly including a directional-control unit. The directional-control unit including a plate-like structure having an upper plate face and an underside plate face with a centre axis extending perpendicularly through a centre of the plate-like structure, and two or more plunger elements distributed along a perimeter portion of the plate-like structure. Each of the two or more plunger elements being slidable relative to the plate-like structure between a retracted position and an extended position along a sliding axis parallel to the centre axis of the plate-like structure. The directional pad assembly including a main support structure in engagement with the underside plate face to support the centre of the plate-like structure of the directional-control unit in a manner such that the plate-like structure of the directional-control unit is multi-directional tiltable about the centre of the plate-like structure with respect to the main support structure. The directional pad assembly including an interface frame structure suspended above the upper plate face of the plate-like structure of the directional-control unit in a manner so as to be in a fixed spatial relationship with the main support structure and non-movable relative to the main support structure, wherein the interface frame structure includes a plurality of frame members arranged to define a central opening aligned to the centre of the plate-like structure of the directional-control unit and two or more auxiliary openings around the central opening, the two or more auxiliary openings respectively aligned to the two or more plunger elements of the directional-control unit. The directional pad assembly including two or more switches arranged around the main support structure, each switch of the two or more switches includes an activation element directed towards the underside plate face of the plate-like structure of the directional-control unit, the two or more switches respectively aligned to the two or more plunger elements. The directional-control unit is operable between a first mode and a second mode to activate the two or more switches. In the first mode, the plate-like structure of the directional-control unit is tiltable to urge at least one of the two or more plunger elements in the retracted position towards a corresponding one of the two or more switches for activating the switch. In the second mode, the plate-like structure of the directional-control unit is stationary with respect to the main support structure, and the two or more plunger elements are individually slidable relative to the plate-like structure into the extended positions to respectively activate the two or more switches.

According to various embodiments, there is provided a handheld controller device including a controller housing and a directional pad assembly. The directional pad assembly including an interface frame structure coupled to the controller housing in a manner so as to be non-movable relative to the controller housing. The interface frame structure being exposed from the controller housing. The interface frame structure including a plurality of frame members arranged to define a central opening and two or more auxiliary openings around the central opening. The directional pad assembly including a directional-control unit disposed below the interface frame structure. The directional-control unit including a plate-like structure having an upper plate face and an underside plate face with a centre axis extending perpendicularly through a centre of the plate-like structure. The upper plate face being directed towards the interface frame structure and the centre of the plate-like structure being aligned to the central opening of the interface frame structure. The directional-control unit including two or more plunger elements distributed along a perimeter portion of the plate-like structure. Each of the two or more plunger elements being slidable relative to the plate-like structure between a retracted position and an extended position along a sliding axis parallel to the centre axis of the plate-like structure. The two or more plunger elements being respectively aligned to the two or more auxiliary openings of the interface frame structure. The directional pad assembly including a main support structure coupled to the controller housing in a manner so as to be non-movable relative to the controller housing, whereby the main support structure is in a fixed spatial relationship with the interface frame structure and non-movable relative to the interface frame structure. The main support structure being disposed below the directional-control unit. The main support structure is in engagement with the underside plate face to support the centre of the plate-like structure in a manner such that the directional-control unit is multi-directional tiltable about the centre of the plate-like structure with respect to the main support structure. The directional pad assembly including two or more switches arranged around the main support structure. Each switch of the two or more switches includes an activation element directed towards the underside plate face of the plate-like structure of the directional-control unit. The two or more switches respectively aligned to the two or more plunger elements. The directional-control unit is operable between a first mode and a second mode to activate the two or more switches. In the first mode, the plate-like structure of the directional-control unit is tiltable to urge at least one of the two or more plunger elements in the retracted position towards a corresponding one of the two or more switches for activating the switch. In the second mode, the plate-like structure of the directional-control unit is stationary with respect to the main support structure, and the two or more plunger elements are individually slidable relative to the plate-like structure into the extended positions to respectively activate the two or more switches.

According to various embodiments, there is provided a directional pad assembly. The directional pad assembly including a directional-control unit. The directional-control unit including a plate-like structure having an upper plate face and an underside plate face with a centre axis extending perpendicularly through a centre of the plate-like structure. The directional-control unit including a primary locking element disposed at the centre of the plate-like structure. The directional-control unit including two or more plunger elements distributed along a perimeter portion of the plate-like structure. Each of the two or more plunger elements being slidable relative to the plate-like structure between a retracted position and an extended position along a sliding axis parallel to the centre axis of the plate-like structure. The directional pad assembly including a main support structure in engagement with the underside plate face to support the centre of the plate-like structure in a manner such that the directional-control unit is multi-directional tiltable about the centre of the plate-like structure with respect to the main support structure. The directional pad assembly including an interface frame structure suspended above the upper plate face of the plate-like structure of the directional-control unit in a manner so as to be in a fixed spatial relationship with the main support structure and non-movable relative to the main support structure. The interface frame structure including a plurality of frame members arranged to define a central opening aligned to the centre of the plate-like structure of the directional-control unit and two or more auxiliary openings around the central opening. The two or more auxiliary openings respectively aligned to the two or more plunger elements of the directional-control unit. The interface frame structure including one or more secondary locking elements around the central opening. The directional pad assembly including two or more switches arranged around the main support structure. Each switch of the two or more switches includes an activation element directed towards the underside plate face of the plate-like structure of the directional-control unit. The two or more switches respectively aligned to the two or more plunger elements. The directional-control unit is selectively operable between a first mode and a second mode to activate the two or more switches by removably locking a swivel-directional-pad-cap or a discrete-directional-pad-cap to the directional-control unit. The directional-control unit is operable in the first mode with the swivel-directional-pad-cap removably locked to the plate-like structure of the directional-control unit, by a corresponding primary locking element disposed at a centre of the swivel-directional-pad-cap in locking engagement with the primary locking element of the plate-like structure of the directional-control unit, such that the swivel-directional-pad-cap and the plate-like structure of the directional-control unit are tiltable to urge at least one of the two or more plunger elements in the retracted position towards a corresponding one of the two or more switches for activating the switch. The directional-control unit is operable in the second mode with the discrete-directional-pad-cap removably locked to the plate-like structure of the directional-control unit and the interface frame structure, by a corresponding primary locking element disposed at a centre of the discrete-directional-pad-cap in locking engagement with the primary locking element of the plate-like structure of the directional-control unit, and one or more corresponding secondary locking elements around the primary locking element in locking engagement with the secondary locking element of the interface frame structure, such that the discrete-directional-pad-cap is removably locked to the plate-like structure of the directional-control unit and the interface frame structure to hold the plate-like structure of the directional-control unit stationary with respect to the main support structure, whereby the two or more plunger elements are individually slidable relative to the plate-like structure into the extended positions to respectively activate the two or more switches.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 7A shows a plunger element of the directional-control unit of FIG. 6A according to various embodiments;

FIG. 7B shows a cut view of the directional-control unit of FIG. 6A according to various embodiments;

FIG. 7C shows an enlarged view of circle A of FIG. 7B according to various embodiments;

FIG. 10A shows a controller having a discrete-directional-pad-cap fitted to a directional pad assembly coupled to a controller housing according to various embodiments;

FIG. 10B shows an assembled view of the discrete-directional-pad-cap according to various embodiments;

FIG. 10C shows an exploded view of the discrete-directional-pad-cap of FIG. 10B according to various embodiments;

DETAILED DESCRIPTION

Figure 1A:
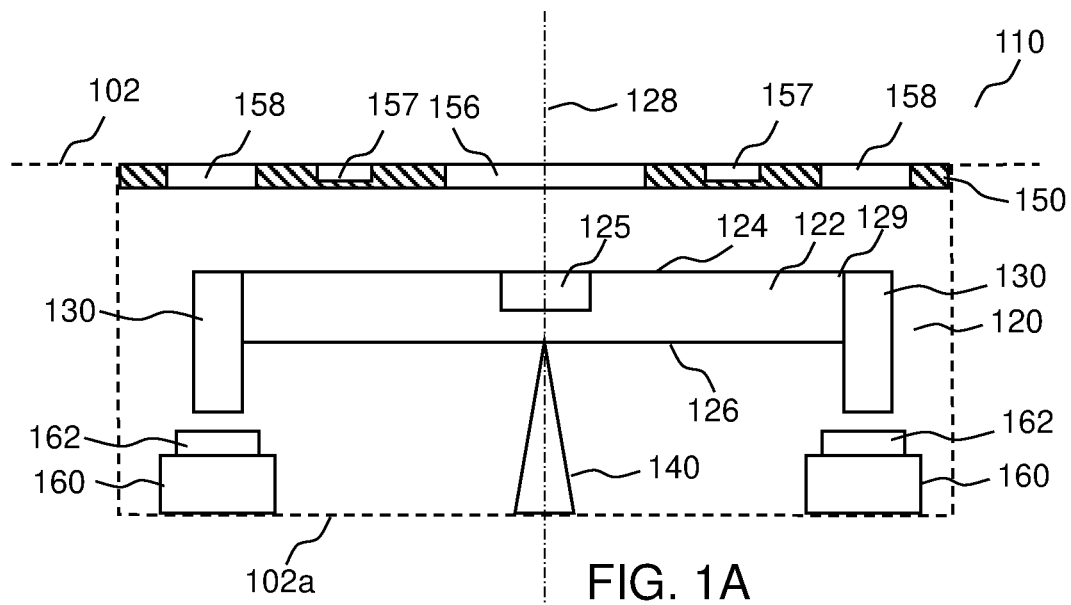
FIG. 1A shows a schematic diagram of a directional pad assembly according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a directional pad assembly and a handheld controller. In particular, various embodiments generally relate to a directional pad assembly for a directional pad (or a D-pad) of a handheld controller, and a handheld controller having the directional pad assembly Various embodiments generally relate to a directional pad assembly. In particular, various embodiments generally relate to a directional pad assembly for a directional pad (D-pad) button of a handheld controller. According to various embodiments, the directional pad assembly may be the mechanism that translate an action of a user thumb, which presses the D-pad of the game controller, into electronic signals when switches are activated by the movement of a directional-control unit of the directional pad assembly. According to various embodiments, the directional pad assembly may be configured such that the user may selectively switch between a swivel D-pad configuration (for example, a thumb stick) and a discrete D-pad configuration (having individual buttons for each direction) depending on the usage required. According to various embodiments, the directional pad assembly may be configured to provide fast response and good feedback for both the swivel D-pad configuration and the discrete D-pad configuration.

According to various embodiments, a D-pad cap of the directional pad assembly may be removable and swappable between a swivel D-pad cap and a discrete D-pad cap. Accordingly, the directional pad assembly may be configured to selectively receive the swivel D-pad cap or the discrete D-pad cap so as to be interchangeable between the swivel D-pad configuration and the discrete D-pad configuration. Hence, the directional pad assembly may be configured for receiving the swivel D-pad cap and also configured for receiving the discrete D-pad cap. According to various embodiments, the directional-control unit of the directional pad assembly may be configured to be operable with the swivel D-pad cap as well as with the discrete D-pad cap.

The following examples pertain to various embodiments.

Example 1 is a directional pad assembly including:
   a directional-control unit having
      a plate-like structure having an upper plate face and an underside plate face with a centre axis extending perpendicularly through a centre of the plate-like structure, and
      two or more plunger elements distributed along a perimeter portion of the plate-like structure, each of the two or more plunger elements being slidable relative to the plate-like structure between a retracted position and an extended position along a sliding axis parallel to the centre axis of the plate-like structure;
   a main support structure in engagement with the underside plate face to support the centre of the plate-like structure of the directional-control unit in a manner such that the plate-like structure of the directional-control unit is multi-directional tiltable about the centre of the plate-like structure with respect to the main support structure;
   an interface frame structure suspended above the upper plate face of the plate-like structure of the directional-control unit in a manner so as to be in a fixed spatial relationship with the main support structure and non-movable relative to the main support structure, wherein the interface frame structure includes a plurality of frame members arranged to define a central opening aligned to the centre of the plate-like structure of the directional-control unit and two or more auxiliary openings around the central opening, the two or more auxiliary openings respectively aligned to the two or more plunger elements of the directional-control unit; and two or more switches arranged around the main support structure, each switch of the two or more switches includes an activation element directed towards the underside plate face of the plate-like structure of the directional-control unit, the two or more switches respectively aligned to the two or more plunger elements, wherein the directional-control unit is operable between a first mode and a second mode to activate the two or more switches, wherein, in the first mode, the plate-like structure of the directional-control unit is tiltable to urge at least one of the two or more plunger elements in the retracted position towards a corresponding one of the two or more switches for activating the switch, wherein, in the second mode, the plate-like structure of the directional-control unit is stationary with respect to the main support structure, and the two or more plunger elements are individually slidable relative to the plate-like structure into the extended positions to respectively activate the two or more switches.

In Example 2, the subject matter of Example 1 may optionally include that wherein the plate-like structure of the directional-control unit may include two or more channels parallel to the centre axis of the plate-like structure and distributed along the perimeter portion of the plate-like structure, the two or more plunger elements respectively extending though the two or more channels in a slidable manner, wherein each of the two or more channels of the plate-like structure may include a first stopper element disposed towards the upper plate face of the plate-like structure and a second stopper element disposed towards the underside plate face of the plate-like structure, wherein each of the two or more plunger elements may include a first abutment surface and a second abutment surface, the first abutment surface and the second abutment surface being directed in two opposite directions with respect to the sliding axis, wherein in the retracted position, the first abutment surface may be abutting the first stopper element, wherein in the extended position, the second abutment surface may be abutting the second stopper element.

In Example 3, the subject matter of Example 2 may optionally include that wherein each of the first stopper element and the second stopper element of each of the two or more channels may include a flange-like structure protruding perpendicularly inwards to form a constriction therewithin, and wherein each of the first abutment surface and the second abutment surface of each of the two or more plunger elements may include a ledge surface perpendicular thereto.

In Example 4, the subject matter of any one of Examples 1 to 3 may optionally include that the plate-like structure of the directional-control unit may include a primary locking element disposed at the centre of the plate-like structure.

In Example 5, the subject matter of Example 4 may optionally include a swivel-directional-pad-cap removably locked to the plate-like structure of the directional-control unit in a manner so as to be tiltable together with the directional-control unit with respect to the main support structure, wherein the swivel-directional-pad-cap may include a corresponding primary locking element disposed at a centre of the swivel-directional-pad-cap in locking engagement with the primary locking element of the plate-like structure of the directional-control unit, wherein the directional-control unit may be operable in the first mode with the swivel-directional-pad-cap removably locked to the plate-like structure of the directional-control unit.

In Example 6, the subject matter of Example 5 may optionally include that wherein the swivel-directional-pad-cap may include a topside serving as a user interface and an underside for engaging the directional-control unit, wherein the corresponding primary locking element may be protruding from the underside of the swivel-directional-pad-cap and extending through the central opening of the interface frame structure to be in locking engagement with the primary locking element of the plate-like structure of the directional-control unit, wherein the swivel-directional-pad-cap further may include a plurality of abutment studs protruding from the underside the swivel-directional-pad-cap, the plurality of abutment studs being arranged to extend through the two or more auxiliary openings of the interface frame structure to engage the upper plate face of the plate-like structure of the directional-control unit along the perimeter portion thereof.

In Example 7, the subject matter of any one of Examples 4 to 6 may optionally include that the primary locking element and the corresponding primary locking element may include a pair of magnets, a pair of a magnet and a metallic element, a pair of tongue and groove, a pair of pin and hole, a pair of snap fit interlocking elements, or a pair of twist and lock interlocking elements.

In Example 8, the subject matter of Example 4 may optionally include that the interface frame structure may include one or more secondary locking elements around the central opening.

In Example 9, the subject matter of Example 8 may optionally include a discrete-directional-pad-cap removably locked to the plate-like structure of the directional-control unit and the interface frame structure in a manner so as to fix the discrete-directional-pad-cap and the plate-like structure of the directional-control unit to the interface frame structure such that the plate-like structure of the directional-control unit is stationary with respect to the main support structure, wherein the discrete-directional-pad-cap may include a corresponding primary locking element disposed at a centre of the discrete-directional-pad-cap in locking engagement with the primary locking element of the plate-like structure of the directional-control unit, and one or more corresponding secondary locking elements around the corresponding primary locking element in locking engagement with the secondary locking element of the interface frame structure, wherein the directional-control unit may be operable in the second mode with the discrete-directional-pad-cap removably locked to the plate-like structure of the directional-control unit and the interface frame structure to hold the plate-like structure of the directional-control unit stationary with respect to the main support structure.

In Example 10, the subject matter of Example 9 may optionally include that wherein the discrete-directional-pad-cap may include two or more buttons and a cap base having a topside with the two or more buttons protruding therefrom to serve as a user interface and an underside for engaging the directional-control unit, wherein the corresponding primary locking element may be protruding from the underside of the cap base and extending through the central opening of the interface frame structure to be in locking engagement with the primary locking element of the plate-like structure of the directional-control unit, wherein the one or more corresponding secondary locking elements may be at the cap base and in locking engagement with the one or more secondary locking elements of the interface frame structure, wherein the two or more buttons of the discrete-directional-pad-cap may be aligned to the two or more auxiliary openings of the interface frame structure, wherein each of the two or more buttons may include an abutment stud protruding from the underside the cap base, the abutment stud extending through a corresponding auxiliary opening of the interface frame structure to engage a corresponding plunger element of the directional-control unit, wherein depressing any one or a combination of the two or more buttons individually may urge a corresponding one or a combination of the two or more plunger elements to respectively slide relative to the plate-like structure into the extended positions, while the plate-like structure remain stationary with respect to the main support structure, to engage a corresponding one or a combination of the two or more switches.

In Example 11, the subject matter of any one of Examples 8 to 10 may optionally include that wherein the primary locking element and the corresponding primary locking element may include a pair of magnets, a pair of a magnet and a metallic element, a pair of tongue and groove, a pair of pin and hole, a pair of snap fit interlocking elements, or a pair of twist and lock interlocking elements, wherein each pair of the one or more secondary locking elements and the one or more corresponding secondary locking elements may include a pair of magnets, a pair of a magnet and a metallic element, a pair of tongue and groove, a pair of pin and hole, a pair of snap fit interlocking elements, or a pair of twist and lock interlocking elements.

In Example 12, the subject matter of any one of Examples 1 to 11 may optionally include that wherein the plate-like structure of the directional-control unit may include a centre support shaft protruding from the underside plate face and coaxial with the centre axis of the plate-like structure, wherein the main support structure may include a socket to receive the centre support shaft in a manner so as to insert the centre support shaft into the socket for supporting the centre of the plate-like structure.

In Example 13, the subject matter of Example 12 may optionally include two or more elastically deformable auxiliary support structures arranged around the main support structure in a manner so as to alternate with the two or more switches, wherein the two or more elastically deformable auxiliary support structures may abut the underside plate face of the plate-like structure of the directional-control unit so as to bias the plate-like structure in a neutral equilibrium un-tilted orientation with respect to the main support structure.

In Example 14, the subject matter of Example 13 may optionally include that the main support structure and the two or more elastically deformable auxiliary support structures may be integrally moulded as a single membrane structure.

In Example 15, the subject matter of Example 14 may optionally include a membrane holder to hold the single membrane structure.

In Example 16, the subject matter of Example 15 may optionally include that the membrane holder and the single membrane structure may be co-moulded as a single piece.

In Example 17, the subject matter of Example 15 or 16 may optionally include that the interface frame structure may be fixedly coupled to the membrane holder.

In Example 18, the subject matter of Example 17 may optionally include one or more wall structures extending between the membrane holder and the interface frame structure to suspend the interface frame structure above the upper plate face of the plate-like structure of the directional-control unit.

In Example 19, the subject matter of any one of Examples 1 to 18 may optionally include two or more elastically deformable spacers respectively disposed between the two or more plunger elements and the two or more switches.

Example 20 is a handheld controller device including:
a controller housing; and
a directional pad assembly including
an interface frame structure coupled to the controller housing in a manner so as to be non-movable relative to the controller housing, the interface frame structure being exposed from the controller housing, wherein the interface frame structure includes
a plurality of frame members arranged to define a central opening and two or more auxiliary openings around the central opening,
a directional-control unit disposed below the interface frame structure, wherein the directional-control unit includes
a plate-like structure having an upper plate face and an underside plate face with a centre axis extending perpendicularly through a centre of the plate-like structure, the upper plate face being directed towards the interface frame structure and the centre of the plate-like structure being aligned to the central opening of the interface frame structure, and
two or more plunger elements distributed along a perimeter portion of the plate-like structure, each of the two or more plunger elements being slidable relative to the plate-like structure between a retracted position and an extended position along a sliding axis parallel to the centre axis of the plate-like structure, the two or more plunger elements being respectively aligned to the two or more auxiliary openings of the interface frame structure, a main support structure coupled to the controller housing in a manner so as to be non-movable relative to the controller housing, whereby the main support structure is in a fixed spatial relationship with the interface frame structure and non-movable relative to the interface frame structure, the main support structure being disposed below the directional-control unit, wherein the main support structure is in engagement with the underside plate face to support the centre of the plate-like structure in a manner such that the directional-control unit is multi-directional tiltable about the centre of the plate-like structure with respect to the main support structure two or more switches arranged around the main support structure, each switch of the two or more switches includes an activation element directed towards the underside plate face of the plate-like structure of the directional-control unit, the two or more switches respectively aligned to the two or more plunger elements, wherein the directional-control unit is operable between a first mode and a second mode to activate the two or more switches, wherein, in the first mode, the plate-like structure of the directional-control unit is tiltable to urge at least one of the two or more plunger elements in the retracted position towards a corresponding one of the two or more switches for activating the switch, wherein, in the second mode, the plate-like structure of the directional-control unit is stationary with respect to the main support structure, and the two or more plunger elements are individually slidable relative to the plate-like structure into the extended positions to respectively activate the two or more switches.

In Example 21, the subject matter of Example 20 may optionally include that wherein the plate-like structure of the directional-control unit may include two or more channels parallel to the centre axis of the plate-like structure and distributed along the perimeter portion of the plate-like structure, the two or more plunger elements respectively extending though the two or more channels in a slidable manner, wherein each of the two or more channels of the plate-like structure may include a first stopper element disposed towards the upper plate face of the plate-like structure and a second stopper element disposed towards the underside plate face of the plate-like structure, wherein each of the two or more plunger elements may include a first abutment surface and a second abutment surface, the first abutment surface and the second abutment surface being directed in two opposite directions with respect to the sliding axis, wherein in the retracted position, the first abutment surface may be abutting the first stopper element, wherein in the extended position, the second abutment surface may be abutting the second stopper element.

In Example 22, the subject matter of Example 21 may optionally include that wherein each of the first stopper element and the second stopper element of each of the two or more channels may include a flange-like structure protruding perpendicularly inwards to form a constriction therewithin, and wherein each of the first abutment surface and the second abutment surface of each of the two or more plunger elements may include a ledge surface perpendicular thereto.

In Example 23, the subject matter of any one of Examples 20 to 22 may optionally include that the plate-like structure of the directional-control unit may include a primary locking element disposed at the centre of the plate-like structure.

In Example 24, the subject matter of Example 23 may further include a swivel-directional-pad-cap removably locked to the plate-like structure of the directional-control unit in a manner so as to be tiltable together with the directional-control unit with respect to the main support structure, wherein the swivel-directional-pad-cap may include a corresponding primary locking element disposed at a centre of the swivel-directional-pad-cap in locking engagement with the primary locking element of the plate-like structure of the directional-control unit, wherein the directional-control unit may be operable in the first mode with the swivel-directional-pad-cap removably locked to the plate-like structure of the directional-control unit.

In Example 25, the subject matter of Example 24 may optionally include that wherein the swivel-directional-pad-cap may include a topside directed outward from the controller housing to serve as a user interface and an underside for engaging the directional-control unit, wherein the corresponding primary locking element may be protruding from the underside of the swivel-directional-pad-cap and extending through the central opening of the interface frame structure to be in locking engagement with the primary locking element of the plate-like structure of the directional-control unit, wherein the swivel-directional-pad-cap may further include a plurality of abutment studs protruding from the underside the swivel-directional-pad-cap, the plurality of abutment studs being arranged to extend through the two or more auxiliary openings of the interface frame structure to engage the upper plate face of the plate-like structure of the directional-control unit along the perimeter portion thereof.

In Example 26, the subject matter of any one of Examples 23 to 25 may optionally include that the primary locking element and the corresponding primary locking element may include a pair of magnets, a pair of a magnet and a metallic element, a pair of tongue and groove, a pair of pin and hole, a pair of snap fit interlocking elements, or a pair of twist and lock interlocking elements.

In Example 27, the subject matter of Example 23 may optionally include that the interface frame structure may include one or more secondary locking elements around the central opening.

In Example 28, the subject matter of Example 27 may optionally include a discrete-directional-pad-cap removably locked to the plate-like structure of the directional-control unit and the interface frame structure in a manner so as to fix the discrete-directional-pad-cap and the plate-like structure of the directional-control unit to the interface frame structure such that the plate-like structure of the directional-control unit is stationary with respect to the main support structure, wherein the discrete-directional-pad-cap may include a corresponding primary locking element disposed at a centre of the discrete-directional-pad-cap in locking engagement with the primary locking element of the plate-like structure of the directional-control unit, and one or more corresponding secondary locking elements around the primary locking element in locking engagement with the secondary locking element of the interface frame structure, wherein the directional-control unit may be operable in the second mode with the discrete-directional-pad-cap removably locked to the plate-like structure of the directional-control unit and the interface frame structure to hold the plate-like structure of the directional-control unit stationary with respect to the main support structure.

In Example 29, the subject matter of Example 28 may optionally include that wherein the discrete-directional-pad-cap may include two or more buttons and a cap base having a topside with the two or more buttons protruding therefrom and directed outward from the controller housing to serve as a user interface and an underside for engaging the directional-control unit, wherein the corresponding primary locking element may be protruding from the underside of the cap base and extending through the central opening of the interface frame structure to be in locking engagement with the primary locking element of the plate-like structure of the directional-control unit, wherein the one or more corresponding secondary locking elements may be at the cap base and in locking engagement with the one or more secondary locking elements of the interface frame structure, wherein the two or more buttons of the discrete-directional-pad-cap may be aligned to the two or more auxiliary openings of the interface frame structure, wherein each of the two or more buttons may include an abutment stud protruding from the underside the cap base, the abutment stud extending through a corresponding auxiliary opening of the interface frame structure to engage a corresponding plunger element of the plate-like structure of the directional-control unit, wherein depressing any one or a combination of the two or more buttons individually may urge a corresponding one or a combination of the two or more plunger elements to respectively slide relative to the plate-like structure into the extended positions, while the plate-like structure remain stationary with respect to the main support structure, to engage a corresponding one or a combination of the two or more switches.

In Example 30, the subject matter of any one of Example 27 to 29 may optionally include that wherein the primary locking element and the corresponding primary locking element may include a pair of magnets, a pair of a magnet and a metallic element, a pair of tongue and groove, a pair of pin and hole, a pair of snap fit interlocking elements, or a pair of twist and lock interlocking elements, wherein each pair of the one or more secondary locking elements and the one or more corresponding secondary locking elements may include a pair of magnets, a pair of a magnet and a metallic element, a pair of tongue and groove, a pair of pin and hole, a pair of snap fit interlocking elements, or a pair of twist and lock interlocking elements.

In Example 31, the subject matter of any one of Examples 20 to 30 may optionally include that wherein the plate-like structure of the directional-control unit may include a centre support shaft protruding from the underside plate face and coaxial with the centre axis of the plate-like structure, wherein the main support structure may include a socket to receive the centre support shaft in a manner so as to insert the centre support shaft into the socket for supporting the centre of the plate-like structure.

In Example 32, the subject matter of Example 31 may optionally include two or more elastically deformable auxiliary support structures arranged around the main support structure in a manner so as to alternate with the two or more switches, wherein the two or more elastically deformable auxiliary support structures may abut the underside plate face of the plate-like structure of the directional-control unit so as to bias the plate-like structure in a neutral equilibrium un-tilted orientation with respect to the main support structure.

In Example 33, the subject matter of Example 32 may optionally include that the main support structure and the two or more elastically deformable auxiliary support structures may be integrally moulded as a single membrane structure.

In Example 34, the subject matter of Example 33 may optionally include a membrane holder to hold the single membrane structure, the membrane holder being coupled to the controller housing so as to be non-movable relative to the controller housing.

In Example 35, the subject matter of Example 34 may optionally include that the membrane holder and the single membrane structure may be co-moulded as a single piece.

In Example 36, the subject matter of Example 34 or 35 may optionally include that the interface frame structure may be fixedly coupled to the membrane holder.

In Example 37, the subject matter of Example 36 may optionally include one or more wall structures extending between the membrane holder and the interface frame structure to suspend the interface frame structure above the upper plate face of the plate-like structure of the directional-control unit.

In Example 38, the subject matter of any one of Examples 20 to 27 may optionally include two or more elastically deformable spacers respectively disposed between the two or more plunger elements and the two or more switches.

Example 39 is a directional pad assembly including:
a directional-control unit having
a plate-like structure having an upper plate face and an underside plate face with a centre axis extending perpendicularly through a centre of the plate-like structure,
a primary locking element disposed at the centre of the plate-like structure,
and
two or more plunger elements distributed along a perimeter portion of the plate-like structure, each of the two or more plunger elements being slidable relative to the plate-like structure between a retracted position and an extended position along a sliding axis parallel to the centre axis of the plate-like structure;
a main support structure in engagement with the underside plate face to support the centre of the plate-like structure in a manner such that the directional-control unit is multi-directional tiltable about the centre of the plate-like structure with respect to the main support structure;
an interface frame structure suspended above the upper plate face of the plate-like structure of the directional-control unit in a manner so as to be in a fixed spatial relationship with the main support structure and non-movable relative to the main support structure, wherein the interface frame structure includes
a plurality of frame members arranged to define a central opening aligned to the centre of the plate-like structure of the directional-control unit and two or more auxiliary openings around the central opening, the two or more auxiliary openings respectively aligned to the two or more plunger elements of the directional-control unit, and
one or more secondary locking elements around the central opening; and
two or more switches arranged around the main support structure, each switch of the two or more switches includes an activation element directed towards the underside plate face of the plate-like structure of the directional-control unit, the two or more switches respectively aligned to the two or more plunger elements,
wherein the directional-control unit is selectively operable between a first mode and a second mode to activate the two or more switches by removably locking a swivel-directional-pad-cap or a discrete-directional-pad-cap to the directional-control unit,
wherein, the directional-control unit is operable in the first mode with the swivel-directional-pad-cap removably locked to the plate-like structure of the directional-control unit, by a corresponding primary locking element disposed at a centre of the swivel-directional-pad-cap in locking engagement with the primary locking element of the plate-like structure of the directional-control unit, such that the swivel-directional-pad-cap and the plate-like structure of the directional-control unit are tiltable to urge at least one of the two or more plunger elements in the retracted position towards a corresponding one of the two or more switches for activating the switch,
wherein, the directional-control unit is operable in the second mode with the discrete-directional-pad-cap removably locked to the plate-like structure of the directional-control unit and the interface frame structure, by a corresponding primary locking element disposed at a centre of the discrete-directional-pad-cap in locking engagement with the primary locking element of the plate-like structure of the directional-control unit, and one or more corresponding secondary locking elements around the primary locking element in locking engagement with the secondary locking element of the interface frame structure, such that the discrete-directional-pad-cap is removably locked to the plate-like structure of the directional-control unit and the interface frame structure to hold the plate-like structure of the directional-control unit stationary with respect to the main support structure, whereby the two or more plunger elements are individually slidable relative to the plate-like structure into the extended positions to respectively activate the two or more switches.

In Example 40, the subject matter of Example 39 may optionally include that
wherein the plate-like structure of the directional-control unit may include two or more channels parallel to the centre axis of the plate-like structure and distributed along the perimeter portion of the plate-like structure, the two or more plunger elements respectively extending though the two or more channels in a slidable manner,
wherein each of the two or more channels of the plate-like structure may include a first stopper element disposed towards the upper plate face of the plate-like structure and a second stopper element disposed towards the underside plate face of the plate-like structure,
wherein each of the two or more plunger elements may include a first abutment surface and a second abutment surface, the first abutment surface and the second abutment surface being directed in two opposite directions with respect to the sliding axis,
wherein in the retracted position, the first abutment surface is abutting the first stopper element,
wherein in the extended position, the second abutment surface is abutting the second stopper element.

In Example 41, the subject matter of Example 40 may optionally include that
wherein each of the first stopper element and the second stopper element of each of the two or more channels may include a flange-like structure protruding perpendicularly inwards to form a constriction therewithin, and
wherein each of the first abutment surface and the second abutment surface of each of the two or more plunger elements may include a ledge surface perpendicular thereto.

In Example 42, the subject matter of any one of Examples 39 to 41 may optionally include that
wherein the swivel-directional-pad-cap may include a topside serving as a user interface and an underside for engaging the directional-control unit,
wherein the corresponding primary locking element may be protruding from the underside of the swivel-directional-pad-cap and extending through the central opening of the interface frame structure to be in locking engagement with the primary locking element of the plate-like structure of the directional-control unit,
wherein the swivel-directional-pad-cap may further include a plurality of abutment studs protruding from the underside the swivel-directional-pad-cap, the plurality of abutment studs being arranged to extend through the two or more auxiliary openings of the interface frame structure to engage the upper plate face of the plate-like structure of the directional-control unit along the perimeter portion thereof.

In Example 43, the subject matter of Example 42 may optionally include that the primary locking element and the corresponding primary locking element may include a pair of magnets, a pair of a magnet and a metallic element, a pair of tongue and groove, a pair of pin and hole, a pair of snap fit interlocking elements, or a pair of twist and lock interlocking elements.

In Example 44, the subject matter of any one of Examples 39 to 41 may optionally include that
wherein the discrete-directional-pad-cap may include two or more buttons and a cap base having a topside with the two or more buttons protruding therefrom to serve as a user interface and an underside for engaging the directional-control unit,
wherein the corresponding primary locking element may be protruding from the underside of the cap base and extending through the central opening of the interface frame structure to be in locking engagement with the primary locking element of the plate-like structure of the directional-control unit,
wherein the one or more corresponding secondary locking elements may be at the cap base and in locking engagement with the one or more secondary locking elements of the interface frame structure, wherein the two or more buttons of the discrete-directional-pad-cap may be aligned to the two or more auxiliary openings of the interface frame structure, wherein each of the two or more buttons may include an abutment stud protruding from the underside the cap base, the abutment stud extending through a corresponding auxiliary opening of the interface frame structure to engage a corresponding plunger element of the plate-like structure of the directional-control unit, wherein depressing any one or a combination of the two or more buttons individually may urge a corresponding one or a combination of the two or more plunger elements to respectively slide relative to the plate-like structure into the extended positions, while the plate-like structure remain stationary with respect to the main support structure, to engage a corresponding one or a combination of the two or more switches.

In Example 45, the subject matter of any one of Example 44 may optionally include that wherein the primary locking element and the corresponding primary locking element may include a pair of magnets, a pair of a magnet and a metallic element, a pair of tongue and groove, a pair of pin and hole, a pair of snap fit interlocking elements, or a pair of twist and lock interlocking elements, wherein each pair of the one or more secondary locking elements and the one or more corresponding secondary locking elements may include a pair of magnets, a pair of a magnet and a metallic element, a pair of tongue and groove, a pair of pin and hole, a pair of snap fit interlocking elements, or a pair of twist and lock interlocking elements.

In Example 46, the subject matter of any one of Examples 39 to 45 may optionally include that wherein the plate-like structure of the directional-control unit may include a centre support shaft protruding from the underside plate face and coaxial with the centre axis of the plate-like structure, wherein the main support structure may include a socket to receive the centre support shaft in a manner so as to insert the centre support shaft into the socket for supporting the centre of the plate-like structure.

In Example 47, the subject matter of Example 46 may optionally include two or more elastically deformable auxiliary support structures arranged around the main support structure in a manner so as to alternate with the two or more switches, wherein the two or more elastically deformable auxiliary support structures may abut the underside plate face of the plate-like structure of the directional-control unit so as to bias the plate-like structure in a neutral equilibrium un-tilted orientation with respect to the main support structure.

In Example 48, the subject matter of Example 47 may optionally include that the main support structure and the two or more elastically deformable auxiliary support structures may be integrally moulded as a single membrane structure.

In Example 49, the subject matter of Example 48 may optionally include a membrane holder to hold the single membrane structure.

In Example 50, the subject matter of Example 49 may optionally include that the membrane holder and the single membrane structure may be co-moulded as a single piece. In Example 51, the subject matter of Example 49 or 50 may optionally include that the interface frame structure may be fixedly coupled to the membrane holder.

In Example 52, the subject matter of Example 51 may optionally include one or more wall structures extending between the membrane holder and the interface frame structure to suspend the interface frame structure above the upper plate face of the plate-like structure of the directional-control unit.

In Example 53, the subject matter of any one of Examples 39 to 52 may optionally include two or more elastically deformable spacers respectively disposed between the two or more plunger elements and the two or more switches.

Figure 1B:
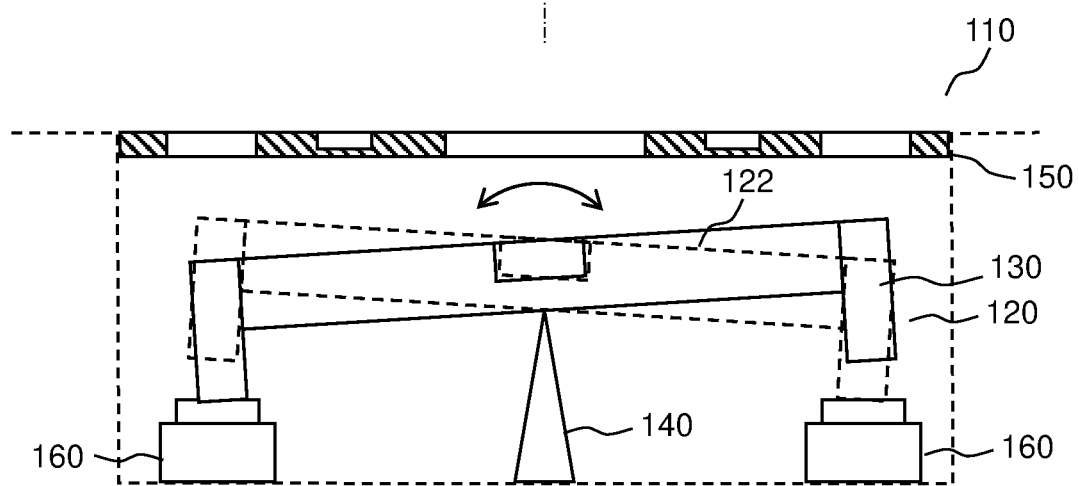
FIG. 1B shows a schematic diagram of the directional pad assembly of FIG. 1A in a first mode of operation according to various embodiments.
Figure 1C:
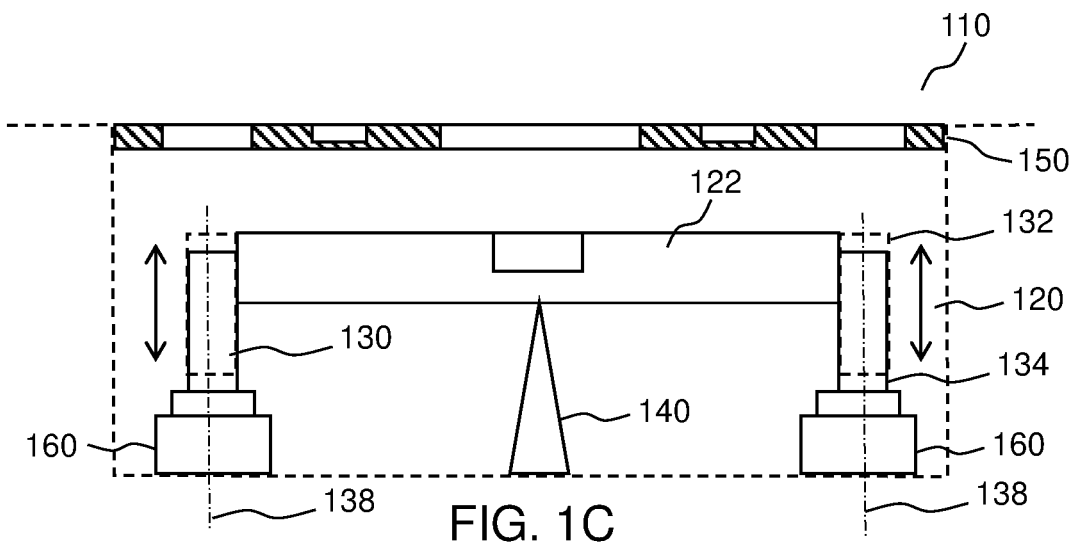
FIG. 1C shows a schematic diagram of the directional pad assembly of FIG. 1A in a second mode of operation according to various embodiments.

FIG. 1A shows a schematic diagram of a directional pad assembly 110 according to various embodiments. FIG. 1B shows a schematic diagram of the directional pad assembly 110 in a first mode of operation according to various embodiments. FIG. 1C shows a schematic diagram of the directional pad assembly 110 in a second mode of operation according to various embodiments. According to various embodiments, the directional pad assembly 110 may be for a controller or a handheld controller or a game controller (for example, see controller 900 of FIG. 9A or FIG. 10A). Hence, the controller may include the directional pad assembly 110. According to various embodiments, the directional pad assembly 110 may include a directional-control unit 120. The directional-control unit 120 may be configured to be an actuation mechanism for receiving a user input provided via a finger (e.g. a thumb) of the user and translating the user input for activating one or more switches to control directions with the directional pad of the controller. According to various embodiments, the directional-control unit 120 may include a plate-like structure 122 having an upper plate face 124 and an underside plate face 126. Accordingly, the plate-like structure 122 may be a thin and broad structure. The upper plate face 124 and the underside plate face 126 may be two opposite broad faces of the plate-like structure 122. According to various embodiments, when the directional pad assembly 110 is installed in the controller, the upper plate face 124 of the plate-like structure 122 may be facing or directed outward of the controller and the underside plate face 124 of the plate-like structure 122 may be facing or directed inward of the controller. According to various embodiments, the plate-like structure 122 may include a centre axis 128 extending perpendicularly though a centre of the plate-like structure. Accordingly, the centre axis 128 may be extending perpendicularly through the upper plate face 124 and the underside plate face 126, and may be passing through respective centres of the upper plate face 124 and the underside plate face 126. According to various embodiments, the plate-like structure 122 may include, but not limited to, a disc shape, a circular shape, a ring shape, an oval shape, a cross shape, or a quadrilateral shape.

According to various embodiments, the directional-control unit 120 may further include two or more plunger elements 130 distributed along a perimeter portion 129 of the plate-like structure 122. Accordingly, the two or more plunger elements 130 may be disposed or located along the perimeter portion 129 of the plate-like structure 122 and angularly spaced apart from each other. Hence, the two or more plunger elements 130 may be arranged along the border or boundary of the plate-like structure 122 so as to be spread or dispersed around the plate-like structure. According to various embodiments, the directional-control unit 120 may include two or three or four or more plunger elements 130. According to various embodiments, each of the two or more plunger elements 130 may be slidable relative to the plate-like structure 122 between a retracted position 132 and an extended position 134 along a sliding axis 138 parallel to the centre axis 128 of the plate-like structure 122. Accordingly, each of the two or more plunger element 130 may be parallel to the centre axis 128 of the plate-like structure 122. Hence, each of the two or more plunger element 130 may be oriented and arranged such that a reciprocating movement of each of the two or more plunger element 130 may be parallel to the centre axis 128 of the plate-like structure 122. Further, in the retracted position 132, each of the two or more plunger element 130 may retreat into the plate-like structure 122 so as to protrude minimally from the underside plate face 126 of the plate-like structure 122. In the extended position 134, each of the two or more plunger element 130 may be further extended from the underside plate face 126 of the plate-like structure 122 so as to be protruding more from the underside plate face 126 of the plate-like structure 122 than that of the retracted position 132.

According to various embodiments, the directional pad assembly 110 may include a main support structure 140. The main support structure 140 may be configured to support the directional-control unit 120. According to various embodiments, the main support structure 140 may be in engagement with the underside plate face 126 of the plate-like structure 122 of the directional-control unit 120 to support the centre of the plate-like structure 122 in a manner such that the plate-like structure 122 of the directional-control unit 120 may be multi-directional tiltable about the centre of the plate-like structure 122 of the directional-control unit 120 with respect to the main support structure 140. Accordingly, the main support structure 140 may support the plate-like structure 122 of the directional-control unit 120 in a manner such that the plate-like structure 122 may be tiltable in multiple radial directions from the centre of the plate-like structure 122. For example, according to various embodiments, the main support structure 140 may be configured to support the plate-like structure 122 of the directional-control unit 120 to be tiltable in at least two opposite radial directions from the centre of the plate-like structure 122, or at least four radial directions, which are 90° apart, from the centre of the plate-like structure 122, or at least eight radial directions, which are 45° apart, from the centre of the plate-like structure 122, or in all radial directions from the centre of the plate-like structure 122. According to various embodiments, the main support structure 140 may provide a pinned support at the centre of the plate-like structure 122 of the directional-control unit 120. According to various embodiments, the main support structure 140 and the centre of the plate-like structure 122 may form a suitable joint arrangement including, but not limited to, a ball and socket joint, or a pin and socket joint.

According to various embodiments, the main support structure 140 may include an upright structure to bear or hold up the center of the plate-like structure 122 of the directional-control unit 120 such that the plate-like structure 122 may be tiltable. According to various other embodiments, the plate-like structure 122 of the directional-control unit 120 may include a center support shaft (for example, see center support shaft 421 of FIG. 4A or FIG. 4B) protruding from the underside plate face 126 of the plate-like structure 122. The center support shaft may be coaxial with the center axis 128 of the plate-like structure 122. Accordingly, the main support structure 140 may include a socket (for example, see socket 442 of FIG. 8) to receive the center support shaft in a manner so as to insert the center support shaft of the plate-like structure 122 into the socket for support the center of the plate-like structure 122 such that the plate-like structure 122 may be tiltable.

According to various embodiments, the directional pad assembly 110 may include an interface frame structure 150. According to various embodiments, the interface frame structure 150 may be configured to interface with a directional pad cap (for example, see swivel-directional-pad-cap 170 of FIG. 2A or discrete-directional-pad-cap 180 of FIG. 3A). Accordingly, the interface frame structure 150 may be configured to receive or to accommodate the directional pad cap. According to various embodiments, the interface frame structure 150 may be suspended above the upper plate face 126 of the plate-like structure 122 of the directional-control unit 120 in a manner so as to be in a fixed spatial relationship with the main support structure 140 and non-movable relative to the main support structure 140. Accordingly, the interface frame structure 150 may be in a fixed position with respect to the main support structure 140. Hence, the interface frame structure 150 may be held in a stationary location above the main support structure 140 such that the directional-control unit 120 is between the interface frame structure 150 and the main support structure 140. Thus, the plate-like structure 122 of the directional-control unit 120 may be tiltable relative to the main support structure 140 as well as the interface frame structure 150.

According to various embodiments, the controller may include a controller housing 102. According to various embodiments, the controller housing 102 may include a recessed portion 102a for receiving the directional pad assembly 110. According to various embodiments, the interface frame structure 150 may be coupled to the controller housing 102. Similarly, the main support structure 140 may also be coupled to the controller housing 102. Accordingly, the interface frame structure 150 and the main support structure 140 may be in the fixed spatial relationship with each other. According to various other embodiments, the interface frame structure 150 may be fixedly coupled to the main support structure 140 so as to be in the fixed spatial relationship with each other, and be inserted together into the recessed portion 102a of the controller housing 120 such that the interface frame structure 150 and the main support structure 140 may be coupled to the controller housing 102.

Figure 5A:
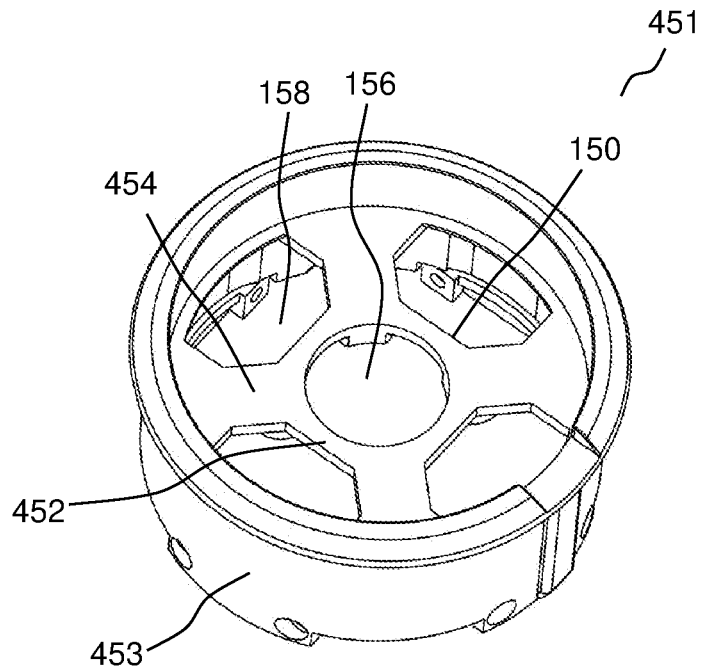
FIG. 5A shows a top view of a cap adapter of the directional pad assembly of FIG. 4A and FIG. 4B according to various embodiments.

According to various embodiments, the interface frame structure 150 of the directional pad assembly 110 may include a plurality of frame members (for example, see frame members 452, 454 in FIG. 5A). According to various embodiments, the interface frame structure 150 may be arranged to define a central opening 156 aligned to the centre of the plate-like structure 122 of the directional-control unit 120 and two or more auxiliary openings 158 around the central opening 156. The two or more auxiliary openings 158 may respectively be aligned to the two or more plunger elements 130 of the directional-control unit 120. Accordingly, the two or more auxiliary openings 158 may be distributed and angularly spaced around the central opening 156. According to various embodiments, the two or more auxiliary openings 158 may include two or three or four or more auxiliary openings 158. According to various embodiments, the plurality of frame members may include hub frame members to define an outline of the central opening 156 and serving as a hub from which spoke frame members may extend radially from the hub frame members to define the two or more auxiliary openings 158 around the central opening 156, whereby the two or more auxiliary openings 158 may be separated by the spoke frame members.

According to various embodiments, the directional pad assembly 110 may include two or more switches 160. The two or more switches 160 may be arranged around the main support structure 140. According to various embodiments, the two or more switches 160 may be distributed equally around the main support structure 140. According to various embodiments, the two or more switches 160 may include two or three or four or more switches 160. According to various embodiments, each switch 160 of the two or more switches 160 may include an activation element 162 directed towards the underside plate face 126 of the plate-like structure 122 of the directional-control unit 120. Accordingly, the activation element 162 may be located at an uppermost portion of each switch 160 of the two or more switches 160. According to various embodiments, the two or more switches 160 may be respectively aligned to the two or more plunger element 130 of the directional-control unit 120. Accordingly, the two or more switches 160 may be angularly spaced and distributed around the main support structure 140 such that the two or more switches 160 may be respectively positioned underneath the two or more plunger element 130 of the directional-control unit 120.

As shown in FIG. 1B and FIG. 1C, the directional-control unit 120 may be operable between two modes, namely the first mode and the second mode, to engage the two or more switches 160. As shown in FIG. 1B, according to various embodiments, in the first mode, the plate-like structure 122 of the directional-control unit 120 may be tiltable to urge at least one of the two or more plunger elements 130 in the retracted position 132 towards and to engage a corresponding one of the two or more switches 160. According to various embodiments, tilting the plate-like structure 122 of the directional-control unit 120 may urge or push the at least one of the two or more plunger elements 130, which is in the retracted position 132 and which is at a lower end of the tilted plate-like structure 122, towards the corresponding one of the two or more switches 160 such that the at least one of the two or more plunger elements 130 may engages the corresponding one of the two or more switches 160. Accordingly, in the first mode, the directional pad assembly 110 may be controlled to provide a directional input via the two or more switches 160 by operating the directional pad assembly 110 to tilt the plate-like structure 122 of the directional-control unit 120 for activating the two or more switches 160.

As shown in FIG. 1C, according to various embodiments, in the second mode, the plate-like structure 122 of the directional-control unit 120 may be stationary with respect to the main support structure 140 as well as the interface frame structure 150. Accordingly, the plate-like structure 122 of the directional-control unit 120 may not be tilted and may remain parallel to the interface frame structure 150. According to various embodiments, the two or more plunger elements 130 may be individually slidable relative to the plate-like structure 122 into the extended positions 134 to respectively engage the two or more switches 160. According to various embodiments, in the second mode, the plate-like structure 122 of the directional-control unit 120 may be locked so as to be stationary with respect to the main support structure 140 as well as the interface frame structure 150. Accordingly, the two or more plunger elements 130 may then be individually slidable relative to the plate-like structure 122 into the extended positions 134 for respectively engaging the two or more switches 160. Hence, when the plate-like structure 122 of the directional-control unit 120 is un-tilted and is stationary with respect to the main support structure 140 as well as the interface frame structure 150, individually urging or pushing the two or more plunger elements 130 may respectively slide or move the two or more plunger elements 130 individually relative to the plate-like structure 122 into the extended positions 134 such that the two or more plunger elements 130 may be individually moved towards the two or more switches 160 for individually engaging the two or more switches 160. Thus, in the second mode, the directional pad assembly 110 may be controlled to provide a directional input via the two or more switches 160 by operating the directional pad assembly 110 to individually move the two or more plunger elements relative to the stationary plate-like structure 122 of the directional-control unit 120 for individually activating the two or more switches 160.

According to various embodiments, the plate-like structure 122 of the directional-control unit 120 may include a primary locking element 125 disposed at the centre of the plate-like structure 122. According to various embodiments, the primary locking element 125 may be configured to engage with a corresponding primary locking element of the directional pad cap (for example, see corresponding primary locking element 175 of FIG. 2A or corresponding primary locking element 185 of FIG. 3A) for removably locking the directional pad cap to the plate-like structure 122 of the directional-control unit 120. According to various embodiments, the primary locking element 125 and the corresponding primary locking element may include, but not limited to, a pair of magnets, a pair of a magnet and a metallic element, a pair of tongue and groove, a pair of pin and hole, a pair of snap fit interlocking elements, or a pair of twist and lock interlocking elements.

According to various embodiments, the interface frame structure 150 may include one or more secondary locking elements 157 around the central opening 156. According to various embodiments, the one or more secondary locking elements 157 may be configured to engage with a corresponding one or more secondary locking elements of the directional pad cap (for example, see secondary locking elements 187 in FIG. 3A) for removably locking the directional pad cap to the interface frame structure 150. According to various embodiments, each pair of the one or more secondary locking elements 157 and the one or more corresponding secondary locking elements may include, but not limited to, a pair of magnets, a pair of a magnet and a metallic element, a pair of tongue and groove, a pair of pin and hole, a pair of snap fit interlocking elements, or a pair of twist and lock interlocking elements.

According to various embodiments, depending on whether the directional pad cap is configured to be removably locked to the plate-like structure 122 of the directional-control unit 120 only, or to both the plate-like structure 122 of the directional-control unit 120 and the interface frame structure 150, the directional-control unit 120 may be operated in the first mode or the second mode respectively. Accordingly, by switching between different types of directional pad cap which either locks to the plate-like structure 122 of the directional-control unit 120 only, or to both the plate-like structure 122 of the directional-control unit 120 and the interface frame structure 150, the directional-control unit 120 may be selectively operated between the first mode or the second mode. Hence, the user may selectively switch between different types of directional pad cap to be used with the same controller.

Figure 2A:
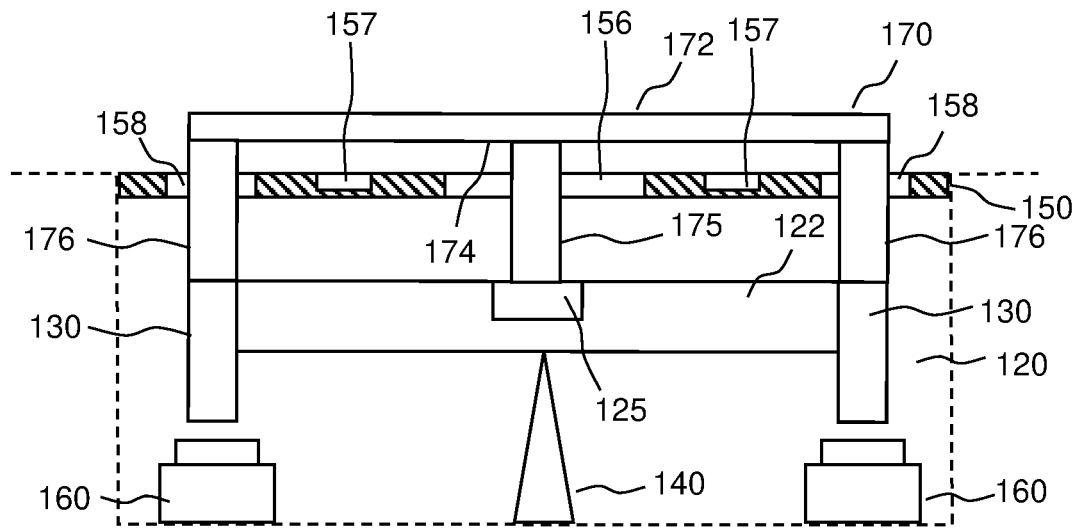
FIG. 2A shows the directional pad assembly of FIG. 1A including a swivel-directional-pad-cap (as one type of directional pad cap) coupled to a directional-control unit of the directional pad assembly according to various embodiments.
Figure 2B:
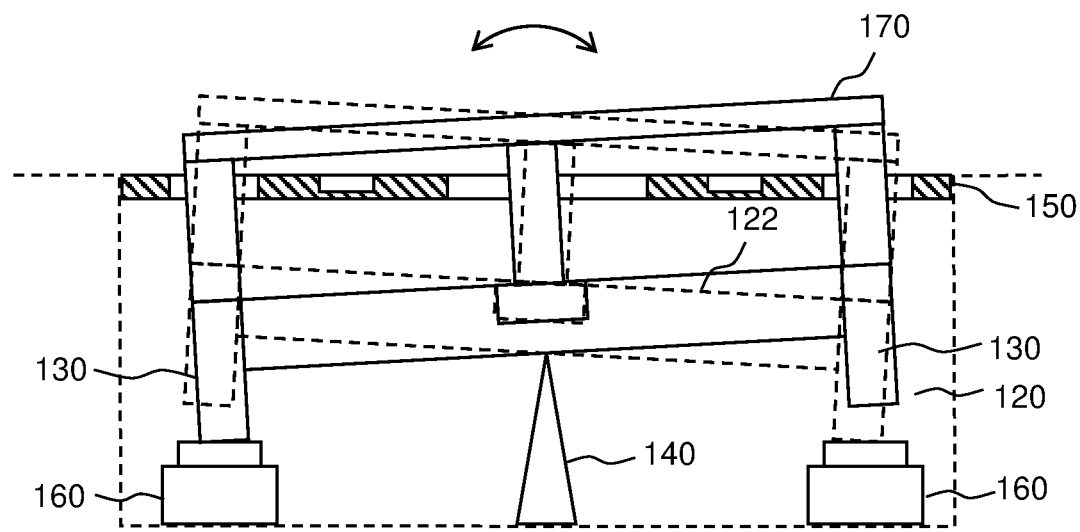
FIG. 2B shows the directional pad assembly of FIG. 2A with the swivel-directional-pad-cap and the directional-control unit being tilted about a main support structure according to various embodiments.

FIG. 2A shows the directional pad assembly 110 including a swivel-directional-pad-cap 170 (as one type of directional pad cap) coupled to the directional-control unit 120 according to various embodiments. FIG. 2B shows the swivel-directional-pad-cap 170 and the directional-control unit 120 being tilted about the main support structure 140 according to various embodiments. According to various embodiments, the swivel-directional-pad-cap 170 may be removably locked to the plate-like structure 122 of the directional-control unit 120 in a manner so as to be tiltable together with the directional-control unit 120 with respect to the main support structure 140. Accordingly, the directional-control unit 120 may be operable in the first mode when the swivel-directional-pad-cap 170 is removably locked to the plate-like structure 122 of the directional-control unit 120. According to various embodiments, the swivel-directional-pad-cap 170 may be lockable to the plate-like structure 122 of the directional-control unit 120 in a removable manner such that the swivel-directional-pad-cap 170 and the plate-like structure 122 may be attached and locked together firmly or securely as a single component as well as may be unlocked, detached and removed (or separated) from each other.

According to various embodiments, the swivel-directional-pad-cap 170 may include a corresponding primary locking element 175 disposed at a centre of the swivel-directional-pad-cap 170. According to various embodiments, when the swivel-directional-pad-cap 170 is removably locked to the plate-like structure 122 of the directional-control unit 120, the corresponding primary locking element 175 of the swivel-directional-pad-cap 170 may be in locking engagement with the primary locking element 125 of the plate-like structure 122 of the directional-control unit 120. Accordingly, the swivel-directional-pad-cap 170 and the plate-like structure 122 of the directional-control unit 120 may be united firmly or securely together. According to various embodiments, the swivel-directional-pad-cap 170 may be free of any corresponding secondary locking elements. Accordingly, the swivel-directional-pad-cap 170 may not be locked or secured or attached or joined to the interface frame structure 150. Hence, the swivel-directional-pad-cap 170 may only be removably locked to the plate-like structure 122 of the directional-control unit 120, and the swivel-directional-pad-cap 170 together with the plate-like structure 122 may be movable relative to the interface frame structure 150.

According to various embodiments, the directional-control unit 120 may be operable in the first mode with the swivel-directional-pad-cap 170 removably locked to the plate-like structure 122 of the directional-control unit 120. Accordingly, with the swivel-directional-pad-cap 170 removably locked only to the plate-like structure 122 of the directional-control unit 120, the swivel-directional-pad-cap 170 together with the plate-like structure 122 may be tiltable about the centre of the plate-like structure 122 with respect to the main support structure 140. Hence, when the swivel-directional-pad-cap 170 and the plate-like structure 122 are tilted together, at least one of the two or more plunger elements 130 in the retracted position 132 with respect to the plate-like structure 122 may be urged or pushed towards a corresponding one of the two or more switches 160 such that the at least one of the two or more plunger elements 130 may engage and activate the corresponding one of the two or more switches 160. Thus, the user may control the swivel-directional-pad-cap 170 for providing a directional input via the two or more switches 160 by the directional-control unit 120 operating in the first mode, whereby the swivel-directional-pad-cap 170 and the plate-like structure 122 may be tilted together for activating the two or more switches 160.

According to various embodiments, the swivel-directional-pad-cap 170 may include a topside 172 serving as a user interface for the user to provide the directional inputs and an underside 174 for engaging the directional-control unit 120. According to various embodiments, the corresponding primary locking element 175 of the swivel-directional-pad-cap 170 may be protruding from the underside 174 of the swivel-directional-pad-cap 170. According to various embodiments, when the swivel-directional-pad-cap 170 is removably locked to the plate-like structure 122 of the directional-control unit 120, the corresponding primary locking element 175 of the swivel-directional-pad-cap 170 may be extending through the central opening 156 of the interface frame structure 150 so as to be in locking engagement with the primary locking element 125 of the plate-like structure 122 of the directional-control unit 120. Accordingly, the corresponding primary locking element 175 of the swivel-directional-pad-cap 170 may be inserted through the central opening 156 of the interface frame structure 150 for locking with the primary locking element 125 of the plate-like structure 122. According to various embodiments, a width of the central opening 156 of the interface frame structure 150 may be larger than a width of the corresponding primary locking element 175 of the swivel-directional-pad-cap 170 protruding from the underside 174 of the swivel-directional-pad-cap 170. Accordingly, the central opening 156 of the interface frame structure 150 may not obstruct or hinder the tilting of the swivel-directional-pad-cap 170. According to various embodiments, the swivel-directional-pad-cap 170 may not be touching or in contact with the interface frame structure 150. According to various embodiments, the swivel-directional-pad-cap 170 may be suspended above or over the interface frame structure 150 in a non-contact manner.

According to various embodiments, the swivel-directional-pad-cap 170 may further include a plurality of abutment studs 176 protruding from the underside 174 the swivel-directional-pad-cap 170. According to various embodiments, the plurality of abutment studs 176 may be distributed or arranged along a perimeter portion of the swivel-directional-pad-cap 170. According to various embodiments, the plurality of abutment studs 176 may be arranged to extend through the two or more auxiliary openings 158 of the interface frame structure 150 to engage the upper plate face 124 of the plate-like structure 122 of the directional-control unit 120 along the perimeter portion 129 thereof. According to various embodiments, the plurality of abutment studs 176 may serve to stabilize the swivel-directional-pad-cap 170 to the plate-like structure 122 of the directional-control unit 120 for enhancing the swivel-directional-pad-cap 170 and the plate-like structure 122 to act as a single component during tilting. According to various embodiments, the plurality of abutment studs 176 may also serve to transfer a tilting force from the user for tilting the swivel-directional-pad-cap 170 and the plate-like structure 122 together about the main support structure 140 when the user apply a tilting force to the topside 172 of the swivel-directional-pad-cap 170. According to various embodiments, the plurality of abutment studs 176 may further serve to retain the at least one of the two or more plunger elements 130, which is at a lower end of the tilted plate-like structure 122, in the retracted position 132 and to urge or push the at least one of the two or more plunger elements 130 towards the corresponding one of the two or more switches 160 for activating said switch.

Figure 3A:
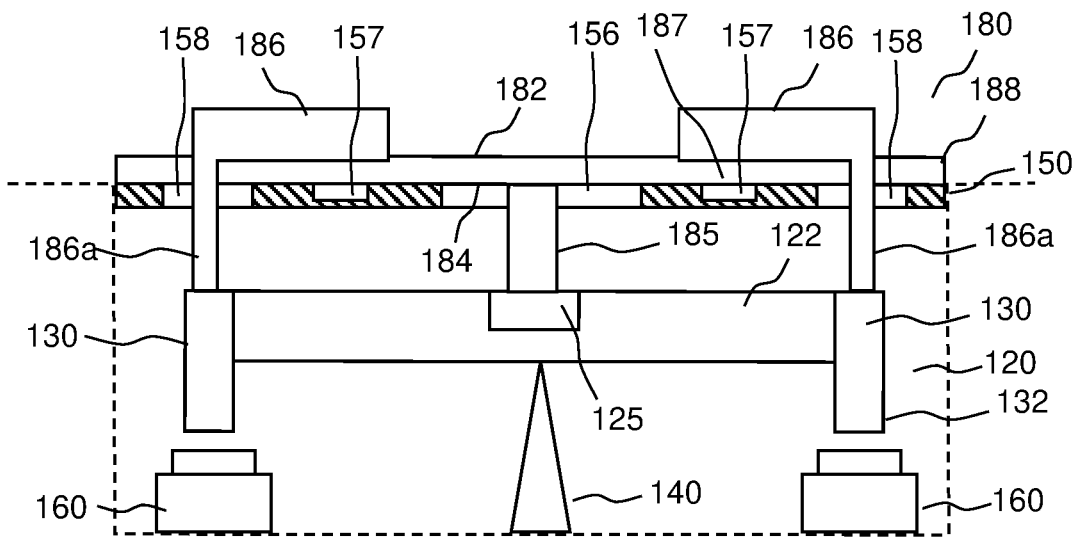
FIG. 3A shows the directional pad assembly of FIG. 1A including a discrete-directional-pad-cap (as one type of directional pad cap) coupled to a directional-control unit according to various embodiments.
Figure 3B:
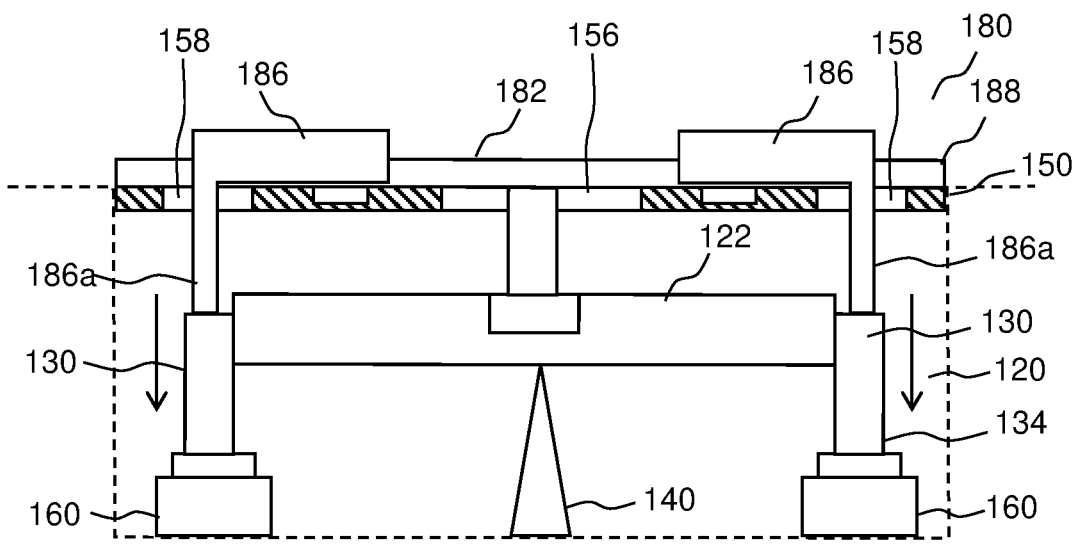
FIG. 3B shows the directional pad assembly of FIG. 3A with individual buttons of the discrete-directional-pad-cap being actuated according to various embodiments.

FIG. 3A shows the directional pad assembly 110 including a discrete-directional-pad-cap 180 (as one type of directional pad cap) coupled to the directional-control unit 120 according to various embodiments. FIG. 3B shows individual buttons 186 of the discrete-directional-pad-cap 180 being actuated according to various embodiments. According to various embodiments, the discrete-directional-pad-cap 180 may be removably locked to the plate-like structure 122 of the directional-control unit 120 and the interface frame structure 150 in a manner such that the plate-like structure 122 of the directional-control unit 120 may be held stationary by the discrete-directional-pad-cap 180. Accordingly, the discrete-directional-pad-cap 180 may be removably locked to the plate-like structure 122 of the directional-control unit 120 and the interface frame structure 150 in a manner so as to fix the discrete-directional-pad-cap 180 and the plate-like structure 122 of the directional-control unit 120 to the interface frame structure 150 such that the plate-like structure 122 of the directional-control unit 120 may be stationary with respect to the main support structure 140. According to various embodiments, the discrete-directional-pad-cap 180 may be lockable to the plate-like structure 122 of the directional-control unit 120 and the interface frame structure 150 in a removable manner such that the discrete-directional-pad-cap 170, the plate-like structure 122 and the interface frame structure 150 may be attached and locked together firmly or securely as a single component as well as may be unlocked, detached and removed (or separated) from each other. According to various embodiments, the directional-control unit 120 may be operable in the second mode when the discrete-directional-pad-cap 180 is removably locked to the plate-like structure 122 of the directional-control unit 120 and the interface frame structure 150. Accordingly, when the discrete-directional-pad-cap 170 is removably locked to the plate-like structure 122 of the directional-control unit 120 and the interface frame structure 150, the plate-like structure 122 of the directional-control unit 120 may no longer be tiltable about the main support structure 140. Rather, the plate-like structure 122 of the directional-control unit 120 may remain stationary with respect to the main support structure 140 as well as the interface frame structure 150. Hence, only the two or more plunger elements 130 of the directional-control unit 120 may be moved or slidden with respect to the plate-like structure 122 of the directional-control unit 120 for activating the two or more switches 160.

According to various embodiments, the discrete-directional-pad-cap 180 may include a corresponding primary locking element 185 disposed at a centre of the discrete-directional-pad-cap 180. According to various embodiments, when the discrete-directional-pad-cap 180 is removably locked to the plate-like structure 122 of the directional-control unit 120, the corresponding primary locking element 185 of the discrete-directional-pad-cap 180 may be in locking engagement with the primary locking element 125 of the plate-like structure 122 of the directional-control unit 120. According to various embodiments, the discrete-directional-pad-cap 180 may include one or more corresponding secondary locking elements 187 around the corresponding primary locking element 185 of the discrete-directional-pad-cap 180. According to various embodiments, when the discrete-directional-pad-cap 180 is removably locked to the interface frame structure 150, the one or more corresponding secondary locking elements 187 may be in locking engagement with the secondary locking element 157 of the interface frame structure 150. Accordingly, with the discrete-directional-pad-cap 180 removably locked to both the plate-like structure 122 of the directional-control unit 120 and the interface frame structure 150, the discrete-directional-pad-cap 180, the plate-like structure 122 of the directional-control unit 120 and the interface frame structure 150 may be united firmly or securely together. Hence, the discrete-directional-pad-cap 180 may be removably locked to both the plate-like structure 122 of the directional-control unit 120 and the interface frame structure 150 so as to immobilize the plate-like structure 122 of the directional-control unit 120 relative to the interface frame structure 150 and the main support structure 140.

According to various embodiments, the directional-control unit 120 may be operable in the second mode with the discrete-directional-pad-cap 180 removably locked to the plate-like structure 122 of the directional-control unit 120 and the interface frame structure 150. Accordingly, with the discrete-directional-pad-cap 180 removably locked to both the plate-like structure 122 of the directional-control unit 120 and the interface frame structure 150, the discrete-directional-pad-cap 180 may be held stationary with respect to the interface frame structure 150 as well as the main support structure 140. Hence, with the plate-like structure 122 held stationary and non-tiltable, only the two or more plunger elements 130 may be urged or pushed so as to move or slide relative to the stationary plate-like structure 122 towards the two or more switches 160 such that the two or more plunger elements 130 may engage and activate the two or more switches 160. Thus, the user may control the discrete-directional-pad-cap 180 for providing a directional input via the two or more switches 160 by the directional-control unit 120 operating in the second mode, whereby the plate-like structure 122 may be stationary and non-tiltable while the two or more plunger elements 130 may move or slide relative to the stationary plate-like structure 122 for activating the two or more switches 160.

According to various embodiments, the discrete-directional-pad-cap 180 may include two or more buttons 186 and a cap base 188 having a topside 182 and an underside 184. The two or more buttons 186 may protrude from the topside 182 of the cap base 188 so as to serve as a user interface for the user to provide the directional inputs. The underside 184 may be for engaging the directional-control unit 120. According to various embodiments, According to various embodiments, the corresponding primary locking element 185 of the discrete-directional-pad cap 180 may be protruding from the underside 184 of the cap base 188. According to various embodiments, when the discrete-directional-pad-cap 180 is removably locked to the plate-like structure 122 of the directional-control unit 120, the corresponding primary locking element 185 of the discrete-directional-pad cap 180 may be extending through the central opening 156 of the interface frame structure 150 so as to be in locking engagement with the primary locking element 125 of the plate-like structure 122 of the directional-control unit 120. Accordingly, the corresponding primary locking element 185 of the discrete-directional-pad-cap 180 may be inserted through the central opening 156 of the interface frame structure 150 for locking with the primary locking element 125 of the plate-like structure 122. According to various embodiments, a width of the central opening 156 of the interface frame structure 150 may be larger than a width of the corresponding primary locking element 185 of the discrete-directional-pad-cap 180 protruding from the underside 184 of the cap base 188.

According to various embodiments, the one or more corresponding secondary locking elements 187 of the discrete-directional-pad cap 180 may be at the cap base 188. For example, according to various embodiments, the one or more corresponding secondary locking elements 187 of the discrete-directional-pad cap 180 may be coupled or attached to the underside 184 of the cap base 188. As another example, according to various embodiments, the one or more corresponding secondary locking elements 187 of the discrete-directional-pad cap 180 may be part of the cap base 188 or may be the cap base 188 itself. According to various embodiments, the discrete-directional-pad cap 180 may be fitted or disposed so as to be abutting the interface frame structure 150 such that the one or more corresponding secondary locking elements 187 of the discrete-directional-pad cap 180 may engage the secondary locking elements 157 of the interface frame structure 150 for locking the discrete-directional-pad cap 180 to the interface frame structure 150. Accordingly, the cap base 188 of the discrete-directional-pad cap 180 may be abutting the interface frame structure 150 to directly engage the one or more corresponding secondary locking elements 187 of the discrete-directional-pad cap 180 with the secondary locking elements 157 of the interface frame structure 150 for locking the discrete-directional-pad cap 180 to the interface frame structure 150. Hence, the one or more corresponding secondary locking elements 187 of the discrete-directional-pad cap 180 at the cap base 188 may be in locking engagement with the one or more secondary locking elements 157 of the interface frame structure 150.

According to various embodiments, the two or more buttons 186 of the discrete-directional-pad-cap 180 may be aligned to the two or more auxiliary openings 158 of the interface frame structure 150. Accordingly, the two or more buttons 186 of the discrete-directional-pad-cap 180 may be arranged to be angularly spaced from each other about a centre of the cap base 188. According to various embodiments, each of the two or more buttons 186 may include an abutment stud 186a protruding from the underside 184 the cap base 188. According to various embodiments, when the discrete-directional-pad-cap 180 is removably locked to the interface frame structure 150, the abutment stud 186a may be extending through a corresponding auxiliary opening 158 of the interface frame structure 150 to engage a corresponding plunger element 130 of the directional-control unit 120 for actuating the corresponding plunger element 130 to activate a corresponding switch 160. According to various embodiments, each of the two or more buttons 186 of the discrete-directional-pad-cap 180 may be movable relative to the cap base 188 in a direction perpendicular to the cap base 188. Accordingly, when the user depress one of the two or more buttons 186, the abutment stud 186a of the depressed button 186 may urge or push the corresponding plunger element 130 of the directional-control unit 120 which may in turn activate the corresponding switch 160. According to various embodiments, the two or more buttons 186 may be individually depressible by the user.

According to various embodiments, depressing any one or a combination of the two or more buttons 186 of the discrete-directional-pad-cap 180 individually may urge a corresponding one or a combination of the two or more plunger elements 130 of the directional-control unit 120 to respectively slide relative to the plate-like structure 122 of the directional-control unit 120 into the extended positions, while the plate-like structure 122 of the directional-control unit 120 remain stationary with respect to the main support structure 140, to engage a corresponding one or a combination of the two or more switches 160. Accordingly, with the plate-like structure 122 of the directional-control unit 120 held stationary with respect to the main support structure 140 and the interface frame structure 150, the user may depress the one or the combination of the two or more buttons 186 of the discrete-directional-pad-cap 180 individually so as to activate the corresponding one or the combination of the two or more switches 160 via moving or sliding the two or more plunger elements 130 of the directional-control unit 120 individually relative to the plate-like structure 122 of the directional-control unit 120 into the extended positions 134 respectively. Thus, the user may control the discrete-directional-pad-cap 180 for providing a directional input via the two or more switches 160 by the directional-control unit 120 operating in the second mode.

Figure 4A:
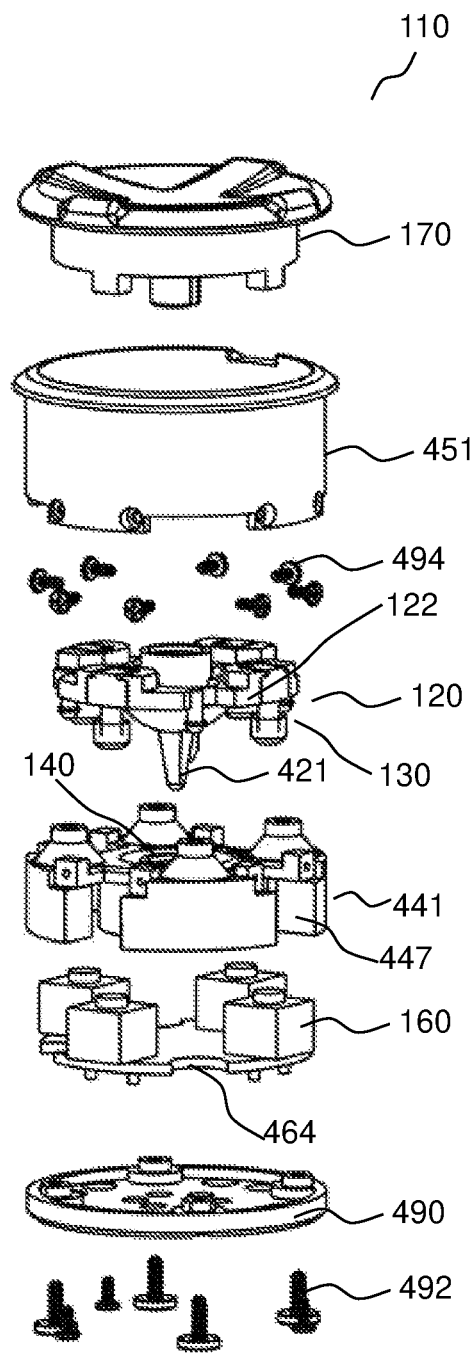
FIG. 4A shows an exploded view of a directional pad assembly with a swivel-directional-pad-cap according to various embodiments.
Figure 4B:
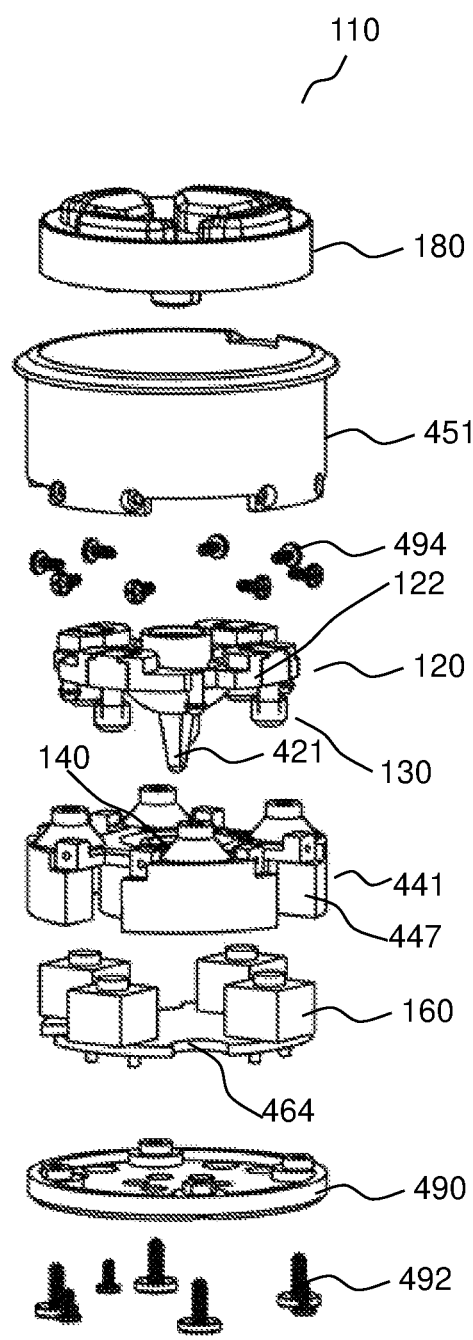
FIG. 4B shows an exploded view of a directional pad assembly with a discrete-directional-pad-cap according to various embodiments.

FIG. 4A shows an exploded view of a directional pad assembly 410 with the swivel-directional-pad-cap 170, as an example of the directional pad assembly 110 of FIG. 1A to FIG. 3B, according to various embodiments. FIG. 4B shows an exploded view of the directional pad assembly 410 with the discrete-directional-pad-cap 180, as an example of the directional pad assembly 110 of FIG. 1A to FIG. 3B, according to various embodiments. According to various embodiments, the directional pad assembly 410 is provided to illustrate an example implementation of the directional pad assembly 110 of FIG. 1A to FIG. 3B. Accordingly, the directional pad assembly 410 includes all the features and limitations of the directional pad assembly 110 of FIG. 1A to FIG. 3B and is described in the following with the same reference characters referring to the same/common parts throughout.

According to various embodiments, the directional pad assembly 410 may, similar to the directional pad assembly 110 of FIG. 1A to FIG. 3B, selectively switch between the swivel-directional-pad-cap 170 and the discrete-directional-pad-cap 180. Accordingly, depending on the usage requirements, the user may selectively switch between using the swivel-directional-pad-cap 170 and the discrete-directional-pad-cap 180 with the controller having the directional pad assembly 410.

As shown in FIG. 4A and FIG. 4B, according to various embodiments, the directional pad assembly 410 may, similar to the directional pad assembly 110 of FIG. 1A to FIG. 3B, include the directional-control unit 120 having the plate-like structure 122 and the two or more plunger elements 130. According to various embodiments, the directional pad assembly 410 may, similar to the directional pad assembly 110 of FIG. 1A to FIG. 3B, include the main support structure 140. According to various embodiments, in the directional pad assembly 410, the main support structure 140 may be part of a support unit 441. According to various embodiments, the directional pad assembly 410 may, similar to the directional pad assembly 110 of FIG. 1A to FIG. 3B, include the two or more switches 160. According to various embodiments, the directional pad assembly 410 may, similar to the directional pad assembly 110 of FIG. 1A to FIG. 3B, include the interface frame structure 150 (see FIG. 5A and FIG. 5B). According to various embodiments, in the directional pad assembly 410, the interface frame structure 150 may be part of a cap adapter 451. For example, according to various embodiments, the directional pad assembly 410 may include four plunger elements 130 distributed along the perimeter portion 129 of the plate-like structure 122 at about 90° interval from each other. For example, according to various embodiments, the directional pad assembly 410 may include four switches 160 arranged around the main support structure 140 at about 90° interval from each other. According to various embodiments, the support unit 441 may include four cove-like formations 447 to accommodate the four switches 160 when the support unit 441 is fitted to a circuit board 464 having the four switches 160. According to various embodiments, the cap adapter 451 may be coupled to the support unit 441 via a plurality of fasteners 494 (e.g. screws) such that the cap adapter 451 and the support unit 441 are non-movable relative to each other. Accordingly, the cap adapter 451 may be fixedly coupled to the support unit 441 in a manner such that the interface frame structure 150 of the cap adapter 451 and the main support structure 140 of the support unit 441 may be in the fixed spatial relationship with each other.

Figure 5B:
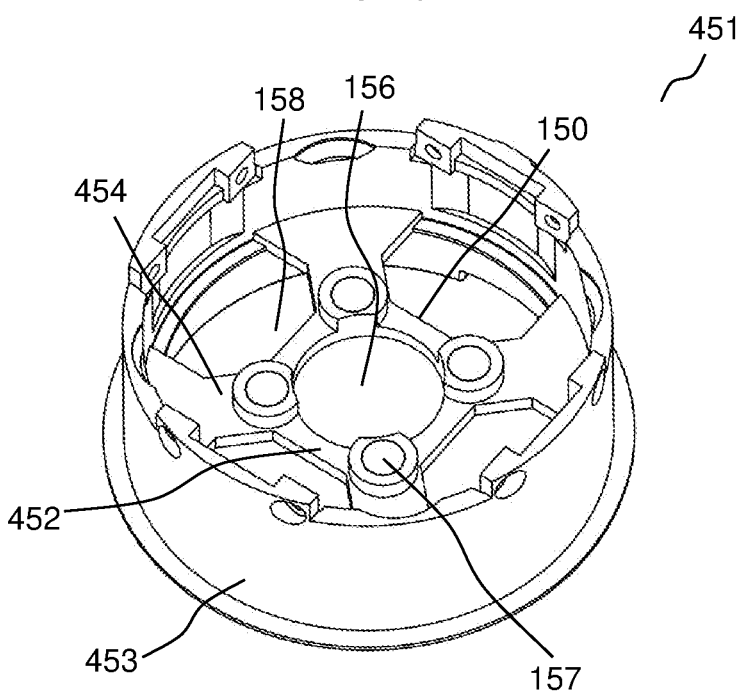
FIG. 5B shows a bottom view of the cap adapter of FIG. 5A according to various embodiments.

FIG. 5A shows a top view of the cap adapter 451 of the directional pad assembly 410 according to various embodiments. FIG. 5B shows a bottom view of the cap adapter 451 of the directional pad assembly 410 according to various embodiments. According to various embodiments, the directional pad assembly 410 may include the interface frame structure 150 being a part of the cap adapter 451. According to various embodiments, the cap adapter 451 may be configured to interchangeably receive or accommodate the swivel-directional-pad-cap 170 or the discrete-directional-pad-cap 180. Accordingly, the interface frame structure 150 may be configured to interchangeably interface with the swivel-directional-pad-cap 170 or the discrete-directional-pad-cap 180. Hence, the interface frame structure 150 may be configured to interchangeably receive or accommodate the swivel-directional-pad-cap 170 or the discrete-directional-pad-cap 180. According to various embodiments, the interface frame structure 150 may be suspended across an upright wall structure 453 of the cap adapter 451 of the directional pad assembly 410. According to various embodiments, the upright wall structure 453 of the cap adapter 451 of the directional pad assembly 410 may be of a cylindrical shape or circular wall. According to various other embodiments, the upright wall structure 453 of the cap adapter 451 of the directional pad assembly 410 may include various other suitable wall structures such as square arrangement of upright walls, or hexagon arrangement of upright walls, or octagon arrangement of upright walls, or decagon arrangement of upright walls, etc.

According to various embodiments, the interface frame structure 150 of the directional pad assembly 410 may include a plurality of frame members 452, 454. According to various embodiments, the interface frame structure 150 may be arranged to define the central opening 156 with hub frame members 452 defining an outline of the central opening 156. Accordingly, the hub frame members 452 may be joined together to form an endless loop to define the central opening 156. The hub frame members 452 may further serve as a hub from which spoke frame members 454 may extend radially from the hub frame members 452 to define the two or more auxiliary openings 158 around the central opening 156. Accordingly, the spoke frame members 454 may extend between the hub frame members 452 and the upright wall structure 453 of the cap adapter 451 of the directional pad assembly 410. For example, according to various embodiments, the interface frame structure 150 of the directional pad assembly 410 may include four auxiliary openings 158 around the central opening 156. For example, accordingly, the interface frame structure 150 of the directional pad assembly 410 may include four spoke frame members 454 extending radially from the hub frame members 452. According to various embodiments, the central opening 156 defined by the hub frame members 452 may be of a circular shape. According to various embodiments, each auxiliary opening 158 may be of a half octagon shape.

According to various embodiments, the interface frame structure 150 of the directional pad assembly 410 may include one or more secondary locking elements 157 around the central opening 156. According to various embodiments, the one or more secondary locking elements 157 may be configured to engage with the corresponding one or more secondary locking elements 187 of the discrete-directional-pad-cap 180 for removably locking the discrete-directional-pad-cap 180 to the interface frame structure 150. For example, according to various embodiments, the interface frame structure 150 of the directional pad assembly 410 may include four secondary locking elements 157 around the central opening 156. According to various embodiments, each of the one or more secondary locking elements 157 may include a magnet. Accordingly, each of the corresponding one or more secondary locking elements 187 of the discrete-directional-pad-cap 180 may include a magnet or a metallic element. Hence, in the directional pad assembly 410, the secondary locking element 157 of the interface frame structure 150 and the secondary locking element 187 of the discrete-directional-pad-cap 180 may be a pair of magnets or a pair of a magnet and a metallic element.

Figure 6A:
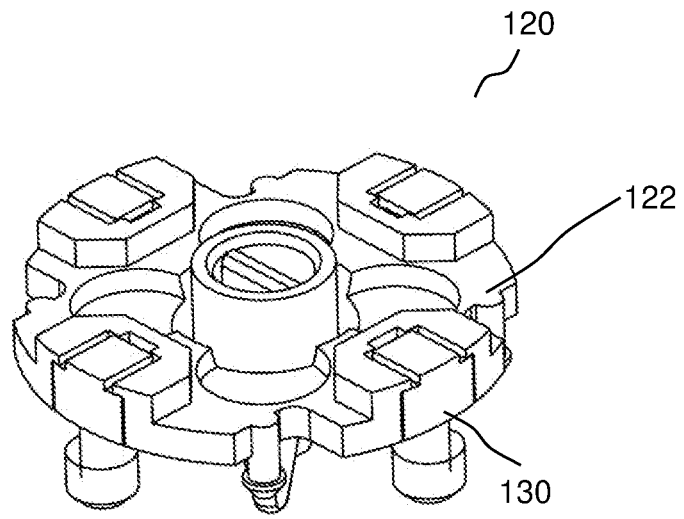
FIG. 6A shows an assembled view of a directional-control unit of the directional pad assembly of FIG. 4A and FIG. 4B according to various embodiments.
Figure 6B:
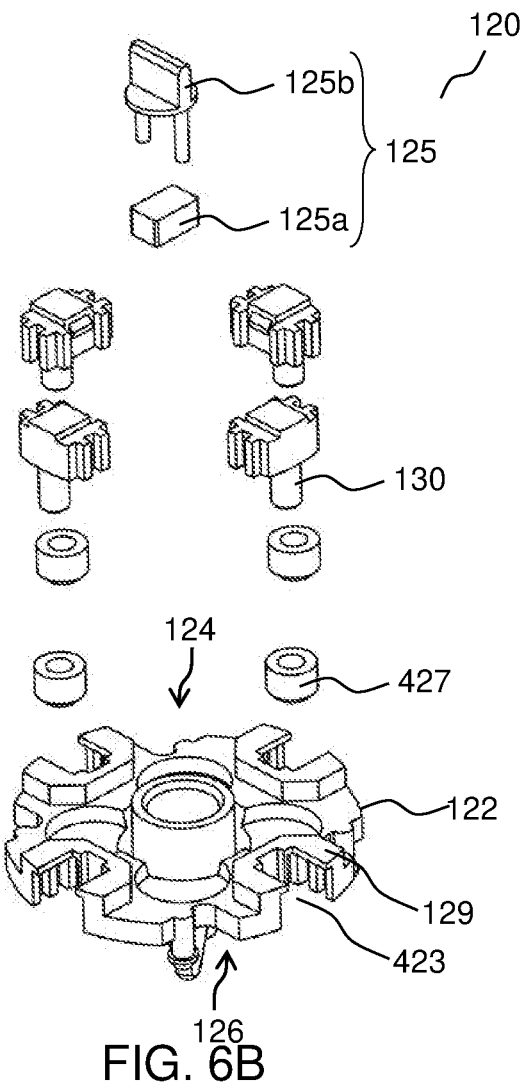
FIG. 6B shows an exploded view of the directional-control unit of FIG. 6A according to various embodiments.

FIG. 6A shows an assembled view of the directional-control unit 120 of the directional pad assembly 410 according to various embodiments. FIG. 6B shows an exploded view of the directional-control unit 120 of the directional pad assembly 410 according to various embodiments. According to various embodiments, the directional-control unit 120 may include a plate-like structure 122 having an upper plate face 124 and an underside plate face 126. According to various embodiments, the directional-control unit 120 may further include two or more plunger elements 130 distributed along a perimeter portion 129 of the plate-like structure 122. Accordingly, the two or more plunger elements 130 may be disposed or located along the perimeter portion 129 of the plate-like structure 122 and angularly spaced apart from each other. Hence, the two or more plunger elements 130 may be arranged along the border or boundary of the plate-like structure 122 so as to be spread or dispersed around the plate-like structure. For example, according to various embodiments, the directional-control unit 120 of the directional pad assembly 410 may include four plunger elements 130.

According to various embodiments, the plate-like structure 122 of the directional-control unit 120 of the directional pad assembly 410 may include the primary locking element 125 disposed at the centre of the plate-like structure 122. According to various embodiments, the primary locking element 125 may be configured to interchangeably engage with the corresponding primary locking element 175 of the swivel-directional-pad-cap 170 or the corresponding primary locking element 185 of the discrete-directional-pad-cap 180 for removably locking the swivel-directional-pad-cap 170 or the discrete-directional-pad-cap 180 to the plate-like structure 122 of the directional-control unit 120 in a manner such that the user may selectively switch between the swivel-directional-pad-cap 170 and the discrete-directional-pad-cap 180. According to various embodiments, the primary locking element 125 may include a magnet 125$a$ and a tongue structure 125$b$. The tongue structure 125$b$ may be extending upright from the magnet 125$a$ so as to be directed towards the corresponding primary locking element 175 of the swivel-directional-pad-cap 170 or the corresponding primary locking element 185 of the discrete-directional-pad-cap 180. According to various embodiments, the corresponding primary locking element 175 of the swivel-directional-pad-cap 170 or the corresponding primary locking element 185 of the discrete-directional-pad-cap 180 may include a magnet or a metallic element as well as a groove structure. For example, the corresponding primary locking element 175 of the swivel-directional-pad-cap 170 or the corresponding primary locking element 185 of the discrete-directional-pad-cap 180 may be made of a metallic element having a groove structure. Hence, the tongue structure 125$b$ of the primary locking element 125 may be inserted into the groove structure and the magnet 125a of the primary locking element 125 may coact or attract the metallic element.

According to various embodiments, the directional-control unit 120 of the directional pad assembly 410 may include two or more elastically deformable spacers 427 respectively disposed at corresponding feet 431 of the two or more plunger elements 130. Since the corresponding feet 431 of the two or more plunger elements 130 may engage the two or more switches 160, the two or more elastically deformable spacers 427 may be between the two or more plunger elements 130 and the two or more switches 160. According to various embodiments, each of the two or more elastically deformable spacers 427 may serve as a cushion between a respective plunger element 130 and a respective switch 160. According to various embodiments, each of the two or more elastically deformable spacers 427 may wrap around a corresponding foot 431 of the respective plunger element 130. According to various embodiments, each elastically deformable spacer 140 may be made of rubber or other suitable elastic polymer. According to various embodiments, with the two or more elastically deformable spacers 427 respectively sandwiched between the two or more plunger elements 130 and the two or more switches 160, the two or more plunger elements 130 may respectively activate the activation elements 162 of the two or more switches 160 via the elastically deformable spacers 427 with minimum time delay. For example, according to various embodiments, the directional-control unit 120 of the directional pad assembly 410 may include four elastically deformable spacers 427.

According to various embodiments, the plate-like structure 122 of the directional-control unit 120 of the directional pad assembly 410 may include two or more channels 423 parallel to the centre axis 128 (see FIG. 1A) of the plate-like structure 122. Accordingly, a longitudinal axis of each of the two or more channels 423 may be parallel to the centre axis 128 of the plate-like structure 122. According to various embodiments, the two or more channels 423 may be distributed along the perimeter portion 129 of the plate-like structure 122. For example, according to various embodiments, the plate-like structure 122 of the directional-control unit 120 of the directional pad assembly 410 may include four channels 423.

FIG. 7A shows a plunger element 130 according to various embodiments. FIG. 7B shows a cut view of the directional-control unit 120 according to various embodiments. FIG. 7C shows an enlarged view of circle A of FIG. 7B according to various embodiments.

According to various embodiments, the two or more plunger elements 130 may be respectively extending though the two or more channels 423 of the plate-like structure 122 of the directional-control unit 120 of the directional pad assembly 410 in a slidable manner. Accordingly, each of the two or more plunger elements 130 may be slidable relative to the plate-like structure 122 of the directional-control unit 120 of the directional pad assembly 410 along a corresponding channel 423.

According to various embodiments, each of the two or more channels 423 of the plate-like structure 122 of the directional-control unit 120 of the directional pad assembly 410 may include a first stopper element 423a disposed towards the upper plate face 124 of the plate-like structure 122 and a second stopper element 423b disposed towards the underside plate face 126 of the plate-like structure 122. Accordingly, the first stopper element 423a and the second stopper element 423b of a channel 423 may serve to limit an amount of sliding of a corresponding plunger element 130 within the channel 423. For example, the first stopper element 423a may serve to retain the corresponding plunger element 130 in the retracted position 132 and the second stopper element 423b may serve to limit the corresponding plunger element 130 to a maximum extension in the extended position 134. According to various embodiments, the first stopper element 423a may be at a level along the channel 423 corresponding to the upper plate face 124 of the plate-like structure 122, and the second stopper element 423b may be at a level along the channel 423 corresponding to the underside plate face 126 of the plate-like structure 122. According to various embodiments, each of the first stopper element 423a and the second stopper element 423b of each of the two or more channels 423 may include a flange-like structure protruding perpendicularly inwards from a corresponding channel wall. Accordingly, each of the first stopper element 423a and the second stopper element 423b may form a constriction along the respective channel 423. According to various embodiments, each of the first stopper element 423a and the second stopper element 423b may extend from at least one side of the respective channel 423. According to various embodiments, the first stopper element 423a and the second stopper element 423b may extend from different sides of the respective channel 423.

According to various embodiments, each of the two or more plunger elements 130 may include a first abutment surface 130a and a second abutment surface 130b. The first abutment surface 130a and the second abutment surface 130b may be directed in two opposite directions with respect to the sliding axis 138. According to various embodiments, each of the first abutment surface 130a and the second abutment surface 130b may be perpendicular to a longitudinal axis of a respective plunger element 130. Accordingly, each of the first abutment surface 130a and the second abutment surface 130b may be a ledge surface perpendicular to the respective plunger element 130. According to various embodiments, the first abutment surface 130a may be further away from the foot 431 of the respective plunger element 130 than that of the second abutment surface 130b. Accordingly, the second abutment surface 130b may be directed in a direction towards the foot 431 of the respective plunger element 130 and the first abutment surface 130a may be directed in a direction away from the foot 431 of the respective plunger element 130. According to various embodiments, each of the first abutment surface 130a and the second abutment surface 130b may extend from at least one side of the respective plunger element 130. According to various embodiments, each of the first abutment surface 130a and the second abutment surface 130b may extend from different sides of the respective plunger element 130.

According to various embodiments, in the retracted position 132, the first abutment surface 130a may be abutting the first stopper element 423a so as to limit the plunger element 130 from retracting beyond the retracted position 132. According to various embodiments, in the extended position 134, the second abutment surface 130b may be abutting the second stopper element 423b so as to limit the plunger element 130 from extending beyond the maximum extended position 134. Accordingly, the first stopper element 423a and the second stopper element 423b of the channel 423 may cooperate with the first abutment surface 130a and the second abutment surface 130b of the plunger element 130 to limit the amount of sliding motion of the plunger element 130 relative to the plate-like structure 122 of the directional-control unit 120.

According to various embodiments, the first stopper element 423a of the channel 423 and the first abutment surface 130a of the plunger element 130 may further serve to urge or push the plunger element 130 when the plate-like structure 122 of the directional-control unit 120 is tilted in the first mode of operation. Accordingly, the first stopper element 423a of the channel 423 may cooperate with the first abutment surface 130a of the plunger element 130 to urge or push the plunger element 130 towards a corresponding switch 160 when the plate-like structure 122 of the directional-control unit 120 is tilted in the first mode of operation.

Figure 8:
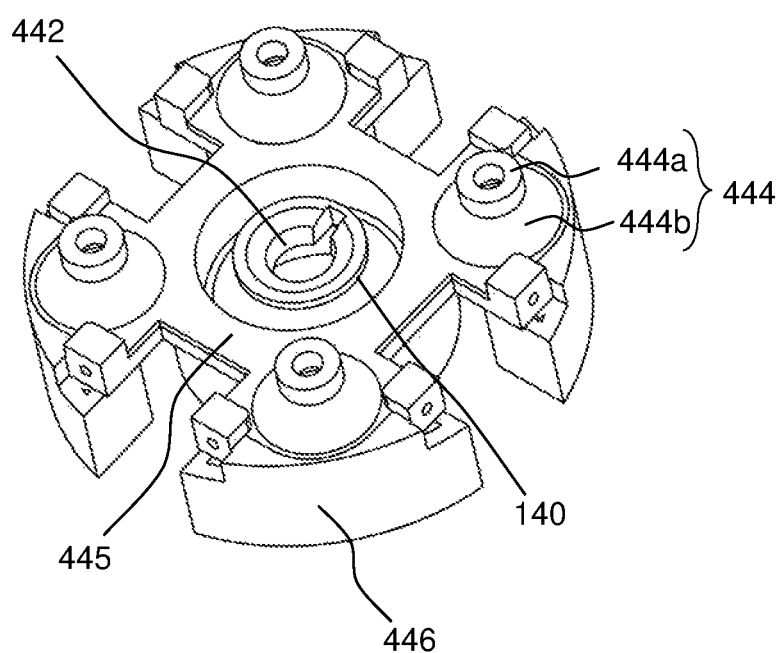
FIG. 8 shows a support unit of the directional pad assembly of FIG. 4A and FIG. 4B according to various embodiments.

FIG. 8 shows the support unit 441 of the directional pad assembly 410 according to various embodiments. According to various embodiments, the directional pad assembly 410 may include the main support structure 140 being a part of the support unit 441. According to various embodiments, the plate-like structure 122 of the directional-control unit 120 may include a center support shaft 421 (for example, see FIG. 4A and FIG. 4B) protruding from the underside plate face 126 of the plate-like structure 122. The center support shaft 421 may be coaxial with the center axis 128 of the plate-like structure 122. Accordingly, the main support structure 140 may include a socket 442 to receive the center support shaft 421 in a manner so as to insert the center support shaft 421 of the plate-like structure 122 into the socket 442 for supporting the center of the plate-like structure 122 such that the plate-like structure 122 may be tiltable. According to various embodiments, the socket 442 may be elastically deformable. Accordingly, when the center support shaft 421 of the plate-like structure 122 is inserted into the socket 442, the socket 422 may be deformed for tilting the plate-like structure 122 of the directional-control unit 120. Subsequently, the socket 422 may return to its original shape upon removal of the tilting force. Hence, the socket 422 may allow a limited degree of movement of the center support shaft 421 of the plate-like structure 122, via elastic deformation, for tilting of the late-like structure 122 of the directional-control unit 120. According to various embodiments, the socket 442 may be made of rubber or other suitable elastic polymer.

According to various embodiments, the support unit 441 of the directional pad assembly 410 may include two or more elastically deformable auxiliary support structures 444. According to various embodiments, the two or more elastically deformable auxiliary support structures 444 may be arranged around the main support structure 140 in a manner so as to alternate with the two or more switches 160. Accordingly, the two or more elastically deformable auxiliary support structures 444 and the two or more switches 160 may be distributed around the main support structure 140 in an alternating manner one after another such that a switch 160 may be followed by an elastically deformable auxiliary support structure 444, and the elastically deformable auxiliary support structure 444 may be followed by another switch 160, and so on. For example, according to various embodiments, the support unit 441 of the directional pad assembly 410 may include four elastically deformable auxiliary support structures 444.

According to various embodiments, the two or more elastically deformable auxiliary support structures 444 may abut the underside plate face 126 of the plate-like structure 122 of the directional-control unit 120 so as to bias the plate-like structure 122 in a neutral equilibrium un-tilted orientation with respect to the main support structure 140. Accordingly, the two or more elastically deformable auxiliary support structures 444 may balance the plate-like structure 122 of the directional-control unit 120 in the neutral equilibrium un-tilted orientation with respect to the main support structure 140. Hence, the two or more elastically deformable auxiliary support structures 444 may provide a tendency for the plate-like structure 122 of the directional-control unit 120 to return to the neutral equilibrium un-tilted orientation after a tilting force is removed from tilting the plate-like structure 122 of the directional-control unit 120. According to various embodiments, the two or more elastically deformable auxiliary support structures 444 may cooperatively return the plate-like structure 122 of the directional-control unit 120 back to the neutral equilibrium un-tilted orientation regardless of the radial direction which the plate-like structure 122 of the directional-control unit 120 may be tilted by the user. According to various embodiments, each of the two or more elastically deformable auxiliary support structures 444 may be made of rubber or other suitable elastic polymers.

According to various embodiments, each of the two or more elastically deformable auxiliary support structure 444 may include a narrower head portion 444a directed towards the underside plate face 126 of the plate-like structure 122 of the directional-control unit 120 and a wider base portion 444b directed away from the underside plate face 126 of the plate-like structure 122 of the directional-control unit 120. According to various embodiments, the narrower head portion 444a may engage with or abut the underside plate face 126 of the plate-like structure 122 of the directional-control unit 120.

According to various embodiments, the main support structure 140 and the two or more elastically deformable auxiliary support structures 444 may be integrally moulded or printed as a single membrane structure 445. Accordingly, the main support structure 140 and the two or more elastically deformable auxiliary support structures 444 may be integrally formed as a one-piece structure which is complete as a whole. According to various embodiments, the main support structure 140 and the two or more elastically deformable auxiliary support structures 444 may be made of the same material. According to various other embodiments, the main support structure 140 and the two or more elastically deformable auxiliary support structures 444 may be made of different materials that are capable of being integrally moulded or printed.

According to various embodiments, the support unit 441 of the directional pad assembly 410 may include a membrane holder 446 to hold the single membrane structure 445 having the main support structure 140 and the two or more elastically deformable auxiliary support structures 444. According to various embodiments, the membrane holder 446 may serve as a base to hold up the single membrane structure 445. Accordingly, the single membrane structure 445 having the main support structure 140 and the two or more elastically deformable auxiliary support structures 444 may be disposed on top of the membrane holder 446.

According to various embodiments, the membrane holder 446 and the single membrane structure 445 may be co-molded as a single piece. According to various embodiments, the membrane holder 446 may be of a material that is different from that of the single membrane structure 445. Accordingly, co-moulding the membrane holder 446 and the single membrane structure 445 may bond the two materials together as the work piece is being formed.

Referring back to FIG. 4A and FIG. 4B, according to various embodiments, the two or more switches 160 may be mounted to a circuit board 464, e.g. a printed circuit board. According to various embodiments, the directional pad assembly 410 may include a base cover 490. According to various embodiments, the circuit board 464 with the two or more switches 160 thereon may be placed on the base cover 490. Further, the support unit 441 may be placed on the circuit board 464 so as to sandwich the circuit board 464 between the support unit 441 and the base cover 490. According to various embodiments, the membrane holder 446 of the support unit 441 may include the cove-like formations 447 to accommodate the two or more switches 160 such that the two or more auxiliary support structures 444 of the support unit 441 may alternate with the two or more switches 160 when the support unit 441 is fitted to the circuit board 464. According to various embodiments, when the circuit board 464 is sandwiched between the support unit 441 and the base cover 490, a plurality of fasteners 492 (e.g. screws) may be used to fasten the support unit 441 to the base cover 490 such that the support unit 441 and the base cover 490 may clamp the circuit board 464 therebetween.

According to various embodiments, the directional-control unit 120 may be supported by the main support structure 140 of the support unit 441. According to various embodiments, the cap adapter 451 may be placed over the support unit 441 and the directional-control unit 120 in a manner such that the upright wall structure 453 of the cap adapter 451 may extend from a perimeter portion of the support unit 441. Accordingly, the directional-control unit 120 may be enclosed within a space defined by the support unit 441, the upright wall structure 453 of the cap adapter 451, and the interface frame structure 150 of the cap adapter 451. Hence, the upright wall structure 453 of the cap adapter 451 may extend between the support unit 441 and the interface frame structure 150 such that the directional-control unit 120 may be contained within the space defined therewithin and the interface frame structure 150 may be suspended above the directional-control unit 120. Since the directional-control unit 120 is supported by the support unit 441 and is not coupled to any portions of the cap adapter 451, the directional-control unit 120 may be tiltable with respect to the support unit 441 within the space defined by the support unit 441, the upright wall structure 453 of the cap adapter 451, and the interface frame structure 150 of the cap adapter 451. According to various embodiments, the upright wall structure 453 of the cap adapter 451 may be coupled to the membrane holder 446 of the support unit 441 via the plurality of fasteners 494 such that the cap adapter 451 and the support unit 441 may be non-movable relative to each other. Accordingly, the interface frame structure 150 of the cap adapter 451 may be fixedly coupled to the membrane holder 446 of the support unit 441 via fastening the upright wall structure 453 of the cap adapter 451 to the membrane holder 446 of the support unit 441 with the plurality of fasteners 494 such that the interface frame structure 150 of the cap adapter 451 may be in a fixed spatial relationship with the main support structure 140 of the support unit 441. According to various embodiments, the swivel-directional-pad-cap 170 or the discrete-directional-pad-cap 180 may be selectively coupled to the cap adapter 451 in a removable manner such that the directional pad assembly 410 may switch between the swivel-directional-pad-cap 170 and the discrete-directional-pad-cap 180. Accordingly, the cap adapter 451 may be configured to selectively receive the swivel-directional-pad-cap 170 or the discrete-directional-pad-cap 180.

Figure 9A:
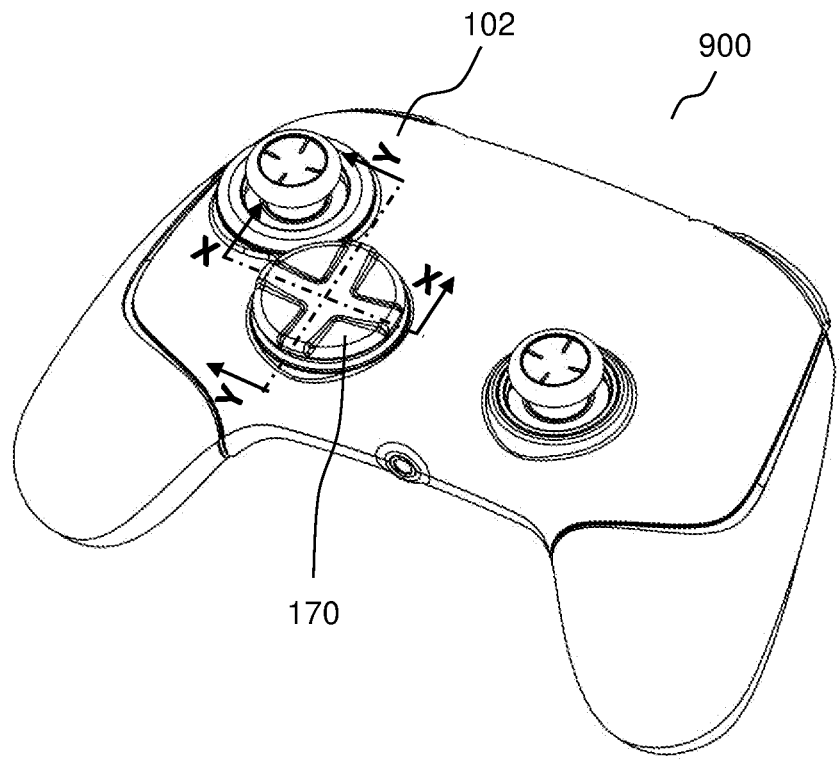
FIG. 9A shows a controller having a swivel-directional-pad-cap fitted to a directional pad assembly coupled to a controller housing 102 according to various embodiments.
Figures 9B, 9C:
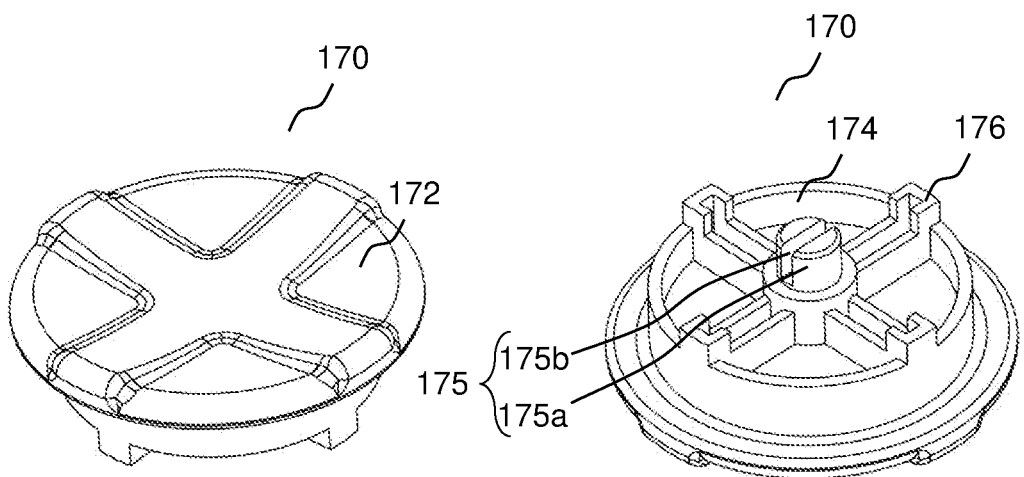
FIG. 9B shows a top perspective view of the swivel-directional-pad-cap according to various embodiments.
FIG. 9C shows a bottom perspective view of the swivel-directional-pad-cap of FIG. 9B according to various embodiments.

FIG. 9A shows a controller 900 having the swivel-directional-pad-cap 170 fitted to the directional pad assembly 410 coupled to the controller housing 102 according to various embodiments. FIG. 9B shows a top perspective view of the swivel-directional-pad-cap 170 according to various embodiments. FIG. 9C shows a bottom perspective view of the swivel-directional-pad-cap 170 according to various embodiments. According to various embodiments, the swivel-directional-pad-cap 170 may include the topside 172 serving as the user interface for the user to provide the directional inputs and an underside 174 for engaging the directional-control unit 120. According to various embodiments, the swivel-directional-pad-cap 170 may include the corresponding primary locking element 175 disposed at a centre of the swivel-directional-pad-cap 170. According to various embodiments, the corresponding primary locking element 175 of the swivel-directional-pad-cap 170 may be protruding from the underside 174 of the swivel-directional-pad-cap 170. According to various embodiments, the corresponding primary locking element 175 of the swivel-directional-pad-cap 170 may be inserted through the central opening 156 of the interface frame structure 150 for locking with the primary locking element 125 of the plate-like structure 122.

According to various embodiments, the corresponding primary locking element 175 of the swivel-directional-pad-cap 170 may include a magnet or a metallic element as well as a groove structure. For example, the corresponding primary locking element 175 of the swivel-directional-pad-cap 170 may be made of a metallic element 175a of a cylindrical shape having a groove 175b dividing the cylindrical shape into two longitudinal halves. Hence, the tongue structure 125b of the primary locking element 125 of the plate-like structure 122 of the directional-control unit 120 may be inserted into the groove 175b, and the magnet 125a of the primary locking element 125 of the plate-like structure 122 of the directional-control unit 120 may coact or attract the metallic element 175a of the corresponding primary locking element 175 of the swivel-directional-pad-cap 170 so as to removably lock the swivel-directional-pad-cap 170 to the plate-like structure 122 of the directional-control unit 120.

According to various embodiments, the swivel-directional-pad-cap 170 may further include the plurality of abutment studs 176 protruding from the underside 174 the swivel-directional-pad-cap 170. For example, according to various embodiments, the swivel-directional-pad-cap 170 may include four abutment studs 176. According to various embodiments, the plurality of abutment studs 176 may be distributed or arranged along a perimeter portion of the swivel-directional-pad-cap 170. According to various embodiments, the plurality of abutment studs 176 may be inserted through the two or more auxiliary openings 158 of the interface frame structure 150 to engage the upper plate face 124 of the plate-like structure 122 of the directional-control unit 120 along the perimeter portion 129 thereof.

Figure 9D:
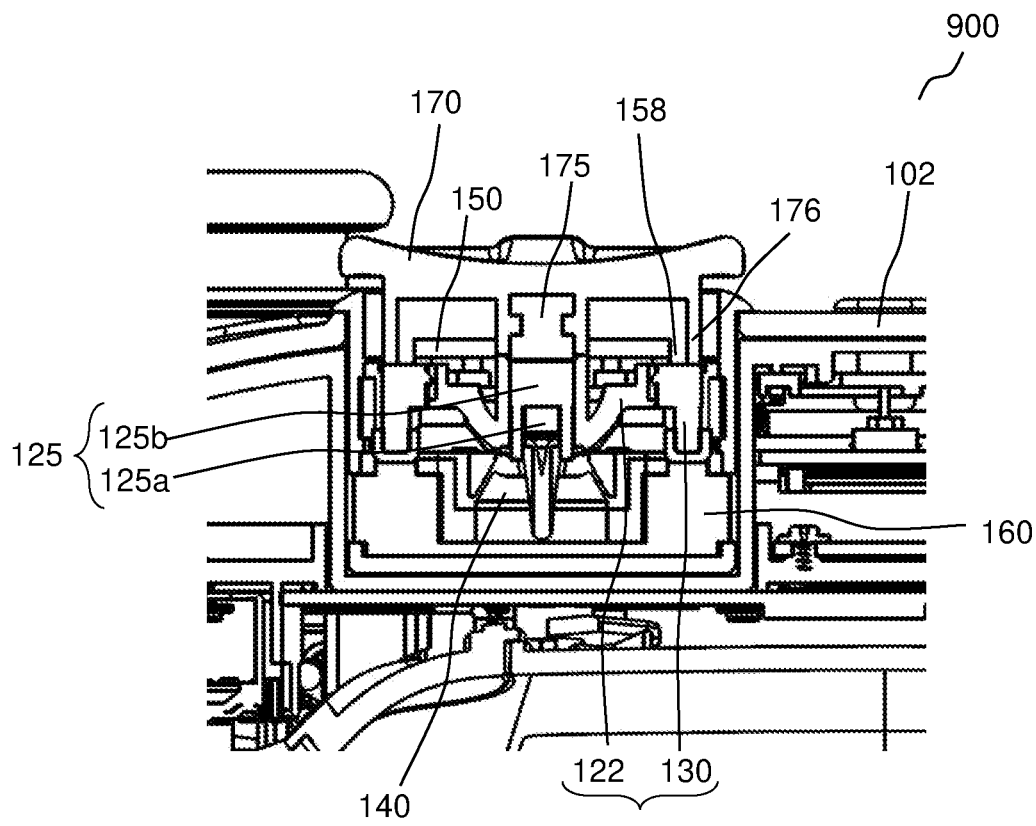
FIG. 9D shows a cross-section X-X view of FIG. 9A according to various embodiments.
Figure 9E:
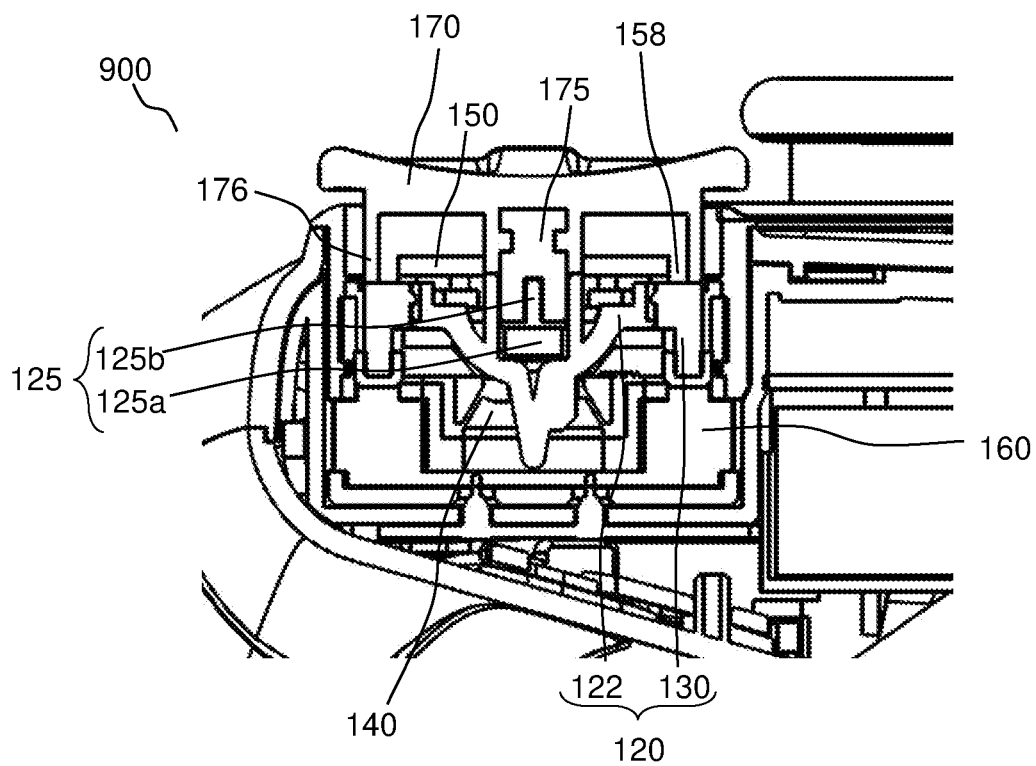
FIG. 9E shows a cross-section Y-Y view of FIG. 9A according to various embodiments.

FIG. 9D shows a cross-section X-X view of FIG. 9A according to various embodiments. FIG. 9E shows a cross-section Y-Y view of FIG. 9A according to various embodiments. As shown, according to various embodiments the swivel-directional-pad-cap 170 may be removably locked to the plate-like structure 122 of the directional-control unit 120 via the corresponding primary locking element 175 of the swivel-directional-pad-cap 170 engaging the primary locking element 125 of the plate-like structure 122 of the directional-control unit 120 through the interface frame structure 150. Further, the plurality of abutment studs 176 may be inserted through the two or more auxiliary openings 158 of the interface frame structure 150 to engage the plate-like structure 122 of the directional-control unit 120. The plate-like structure 122 of the directional-control unit 120 may be supported by the main support structure 140.

The two or more plunger elements 130 of the directional-control unit 120 may engage the two or more switches 160.

FIG. 10A shows the controller 900 having the discrete-directional-pad-cap 180 fitted to the directional pad assembly 410 coupled to the controller housing 102 according to various embodiments. FIG. 10B shows an assembled view of the discrete-directional-pad-cap 180 according to various embodiments. FIG. 10C shows an exploded view of the discrete-directional-pad-cap 180 according to various embodiments. According to various embodiments, the discrete-directional-pad-cap 180 may include the two or more buttons 186 and the cap base 188 having a topside 182 and an underside 184. The two or more buttons 186 may protrude from the topside 182 of the cap base 188 so as to serve as a user interface for the user to provide the directional inputs. The underside 184 of the cap base 188 may be for engaging the directional-control unit 120. For example, according to various embodiments, the discrete-directional-pad-cap 180 may include four buttons 186.

According to various embodiments, the discrete-directional-pad-cap 180 may include the corresponding primary locking element 185 disposed at a centre of the discrete-directional-pad-cap 180. According to various embodiments, the corresponding primary locking element 185 may extend from the underside 184 of the cap base 188. Accordingly, the corresponding primary locking element 185 of the discrete-directional-pad-cap 180 may be inserted through the central opening 156 of the interface frame structure 150 for locking with the primary locking element 125 of the plate-like structure 122. According to various embodiments, the discrete-directional-pad-cap 180 may include the one or more corresponding secondary locking elements 187 around the corresponding primary locking element 185 of the discrete-directional-pad-cap 180. According to various embodiments, the one or more corresponding secondary locking elements 187 may abut the interface frame structure 150 so as to removably lock the discrete-directional-pad-cap 180 to the interface frame structure 150 via the one or more corresponding secondary locking elements 187 of the discrete-directional-pad-cap 180 engaging the secondary locking elements 157 of the interface frame structure 150. Hence, the discrete-directional-pad-cap 180 may be removably locked to both the plate-like structure 122 of the directional-control unit 120 and the interface frame structure 150 so as to immobilize the plate-like structure 122 of the directional-control unit 120 relative to the interface frame structure 150 and the main support structure 140.

According to various embodiments, the two or more buttons 186 of the discrete-directional-pad-cap 180 may be arranged to be angularly spaced from each other about a centre of the cap base 188. According to various embodiments, each of the two or more buttons 186 may include the abutment stud 186a protruding from the underside 184 the cap base 188. According to various embodiments, the abutment stud 186a may be inserted through the corresponding auxiliary opening 158 of the interface frame structure 150 to engage the corresponding plunger element 130 of the directional-control unit 120 for actuating the corresponding plunger element 130 to activate the corresponding switch 160. According to various embodiments, each of the two or more buttons 186 of the discrete-directional-pad-cap 180 may be movable relative to the cap base 188 in a direction perpendicular to the cap base 188. Accordingly, when the user depress one of the two or more buttons 186, the abutment stud 186a of the depressed button 186 may urge or push the corresponding plunger element 130 of the directional-control unit 120 which may in turn activate the corresponding switch 160. According to various embodiments, the two or more buttons 186 may be individually depressible by the user.

According to various embodiments, the corresponding primary locking element 185 of the discrete-directional-pad-cap 180 may include a magnet or a metallic element as well as a groove structure. For example, the corresponding primary locking element 185 of the discrete-directional-pad-cap 180 may be made of a metallic element 185a of a cylindrical shape having a groove 185b dividing the cylindrical shape into two longitudinal halves. Hence, the tongue structure 125b of the primary locking element 125 of the plate-like structure 122 of the directional-control unit 120 may be inserted into the groove 185b, and the magnet 125a of the primary locking element 125 of the plate-like structure 122 of the directional-control unit 120 may coact or attract the metallic element 185a of the corresponding primary locking element 185 of the discrete-directional-pad-cap 180 so as to removably lock the discrete-directional-pad-cap 180 to the plate-like structure 122 of the directional-control unit 120.

According to various embodiments, the one or more corresponding secondary locking elements 187 of the discrete-directional-pad-cap 180 may include a metallic plate 187a. The metallic plate 187a may be of an annular shape. According to various embodiments, the metallic plate 187a may serve as a base cover for the cap base 188. Accordingly, the metallic plate 187a may be coupled to a bottom of the cap base 188. Hence, when the discrete-directional-pad-cap 180 is fitted to the interface frame structure 150, the metallic plate 187a may be abutting the interface frame structure 150 such that the metallic plate 187a may be attracted or may co-act with the secondary locking elements 157 of the interface frame structure 150 in the form of magnets. Thus, the discrete-directional-pad-cap 180 may be removably locked to the interface frame structure 150 via the metallic plate 187a at the bottom of the cap base 188 co-acting with the magnet of the interface frame structure 150.

Figure 10D:
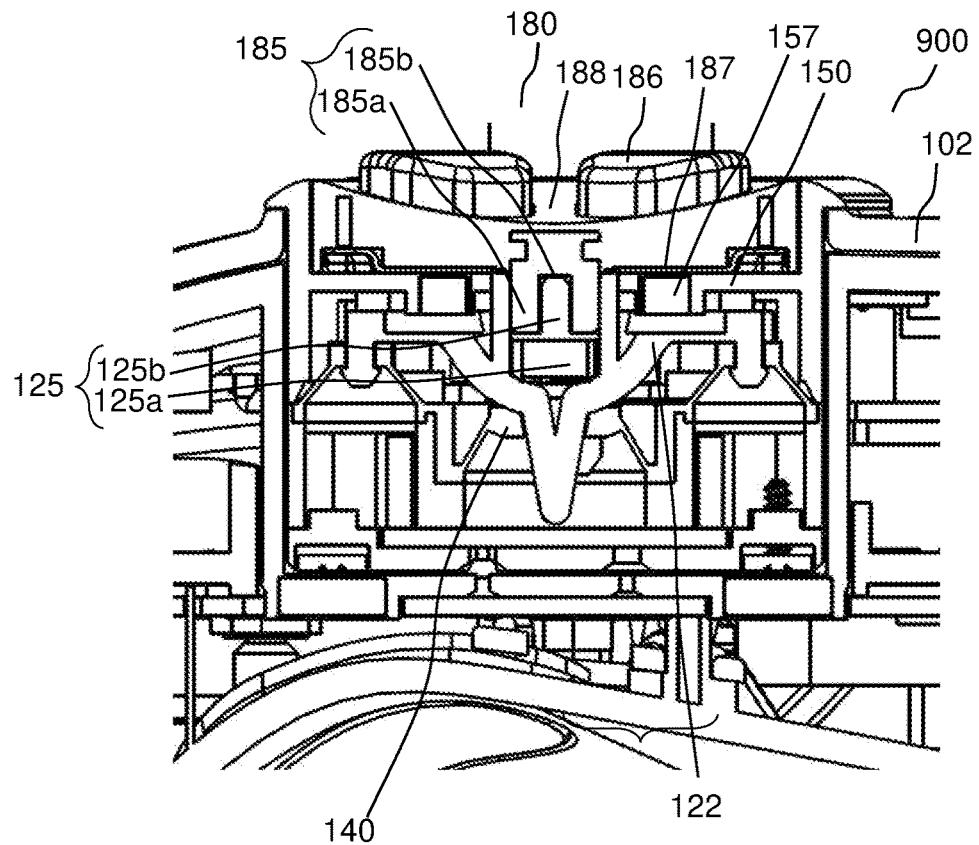
FIG. 10D shows a cross-section X-X view of FIG. 10A according to various embodiments.
Figure 10E:
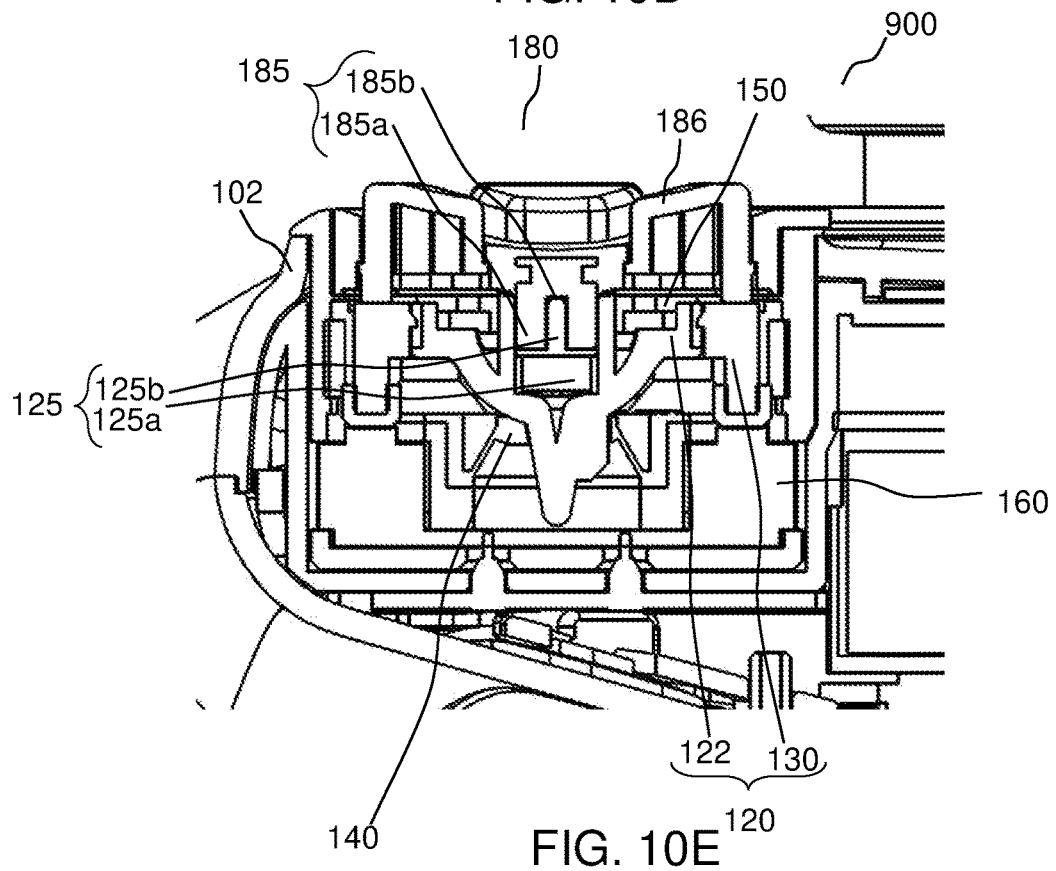
FIG. 10E shows a cross-section Y-Y view of FIG. 10A according to various embodiments.

FIG. 10D shows a cross-section X-X view of FIG. 10A according to various embodiments. FIG. 10E shows a cross-section Y-Y view of FIG. 10A according to various embodiments. As shown, according to various embodiments the discrete-directional-pad-cap 180 may be removably locked to the plate-like structure 122 of the directional-control unit 120 via the corresponding primary locking element 185 of the discrete-directional-pad-cap 180 engaging the primary locking element 125 of the plate-like structure 122 of the directional-control unit 120 through the interface frame structure 150. The discrete-directional-pad-cap 180 may be removably locked to the interface frame structure 150 via the corresponding secondary locking elements 187 of the discrete-directional-pad-cap 180 engaging the secondary locking elements 157 of the interface frame structure 150. Further, the abutment studs 186s of the two or more buttons 186 may be inserted through the two or more auxiliary openings 158 of the interface frame structure 150 to engage the two or more plunger elements 130 of the directional-control unit 120. The plate-like structure 122 of the directional-control unit 120 may be supported by the main support structure 140. The two or more plunger elements 130 of the directional-control unit 120 may engage the two or more switches 160.

Various embodiments have provided a more effective and versatile directional pad assembly which interchangeably switch between a swivel-directional-pad-cap and a discrete-directional-pad-cap for a same controller. Various embodiments have also provided a more effective directional pad assembly which may allow the user to switch between different types of directional pad cap depending on usage requirement without requiring changing of the controller.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A directional pad assembly comprising:
    a directional-control unit having
        a plate structure having an upper plate face and an underside plate face with a centre axis extending perpendicularly through a centre of the plate structure, and
        two or more plunger elements distributed along a perimeter portion of the plate structure, each of the two or more plunger elements being slidable relative to the plate structure between a retracted position and an extended position along a sliding axis parallel to the centre axis of the plate structure;
    a main support structure in engagement with the underside plate face to support the centre of the plate structure of the directional-control unit in a manner such that the plate structure of the directional-control unit is multi-directional tiltable about the centre of the plate structure with respect to the main support structure;
    an interface frame structure suspended above the upper plate face of the plate structure of the directional-control unit in a manner so as to be in a fixed spatial relationship with the main support structure and non-movable relative to the main support structure, wherein the interface frame structure comprises
        a plurality of frame members arranged to define a central opening aligned to the centre of the plate structure of the directional-control unit and two or more auxiliary openings around the central opening, the two or more auxiliary openings respectively aligned to the two or more plunger elements of the directional-control unit; and
    two or more switches arranged around the main support structure, each switch of the two or more switches comprises an activation element directed towards the underside plate face of the plate structure of the directional-control unit, the two or more switches respectively aligned to the two or more plunger elements,
    wherein the directional-control unit is operable between a first mode and a second mode to activate the two or more switches,
    wherein, in the first mode, the plate structure of the directional-control unit is tiltable to urge at least one of the two or more plunger elements in the retracted position towards a corresponding one of the two or more switches for activating the switch,
    wherein, in the second mode, the plate structure of the directional-control unit is stationary with respect to the main support structure, and the two or more plunger elements are individually slidable relative to the plate structure into the extended positions to respectively activate the two or more switches.

2. The assembly as claimed in claim 1,
    wherein the plate structure of the directional-control unit comprises two or more channels parallel to the centre axis of the plate structure and distributed along the perimeter portion of the plate structure, the two or more plunger elements respectively extending though the two or more channels in a slidable manner,
    wherein each of the two or more channels of the plate structure comprises a first stopper element disposed towards the upper plate face of the plate structure and a second stopper element disposed towards the underside plate face of the plate structure,
    wherein each of the two or more plunger elements comprises a first abutment surface and a second abutment surface, the first abutment surface and the second abutment surface being directed in two opposite directions with respect to the sliding axis,
    wherein in the retracted position, the first abutment surface is abutting the first stopper element,
    wherein in the extended position, the second abutment surface is abutting the second stopper element.

3. The assembly as claimed in claim 2,
    wherein each of the first stopper element and the second stopper element of each of the two or more channels comprises a flange structure protruding perpendicularly inwards to form a constriction therewithin, and
    wherein each of the first abutment surface and the second abutment surface of each of the two or more plunger elements comprises a ledge surface perpendicular thereto.

4. The assembly as claimed in claim 1, wherein the plate structure of the directional-control unit comprises a primary locking element disposed at the centre of the plate structure.

5. The assembly as claimed in claim 4, further comprising a swivel-directional-pad-cap removably locked to the plate structure of the directional-control unit in a manner so as to be tiltable together with the directional-control unit with respect to the main support structure,
    wherein the swivel-directional-pad-cap comprises a corresponding primary locking element disposed at a centre of the swivel-directional-pad-cap in locking engagement with the primary locking element of the plate structure of the directional-control unit,
    wherein the directional-control unit is operable in the first mode with the swivel-directional-pad-cap removably locked to the plate structure of the directional-control unit.

6. The assembly as claimed in claim 5,
    wherein the swivel-directional-pad-cap comprises a topside serving as a user interface and an underside for engaging the directional-control unit,
    wherein the corresponding primary locking element is protruding from the underside of the swivel-directional-pad-cap and extending through the central opening of the interface frame structure to be in locking engagement with the primary locking element of the plate structure of the directional-control unit,
    wherein the swivel-directional-pad-cap further comprises a plurality of abutment studs protruding from the underside the swivel-directional-pad-cap, the plurality of abutment studs being arranged to extend through the two or more auxiliary openings of the interface frame structure to engage the upper plate face of the plate structure of the directional-control unit along the perimeter portion thereof.

7. The assembly as claimed in claim 4, wherein the primary locking element and the corresponding primary locking element comprises a pair of magnets, a pair of a magnet and a metallic element, a pair of tongue and groove, a pair of pin and hole, a pair of snap fit interlocking elements, or a pair of twist and lock interlocking elements.

8. The assembly as claimed in claim 4, wherein the interface frame structure comprises one or more secondary locking elements around the central opening.

9. The assembly as claimed in claim 8, further comprising a discrete-directional-pad-cap removably locked to the plate structure of the directional-control unit and the interface frame structure in a manner so as to fix the discrete-directional-pad-cap and the plate structure of the directional-control unit to the interface frame structure such that the plate structure of the directional-control unit is stationary with respect to the main support structure,
wherein the discrete-directional-pad-cap comprises a corresponding primary locking element disposed at a centre of the discrete-directional-pad-cap in locking engagement with the primary locking element of the plate structure of the directional-control unit, and one or more corresponding secondary locking elements around the corresponding primary locking element in locking engagement with the secondary locking element of the interface frame structure,
wherein the directional-control unit is operable in the second mode with the discrete-directional-pad-cap removably locked to the plate structure of the directional-control unit and the interface frame structure to hold the plate structure of the directional-control unit stationary with respect to the main support structure.

10. The assembly as claimed in claim 9,
wherein the discrete-directional-pad-cap comprises two or more buttons and a cap base having a topside with the two or more buttons protruding therefrom to serve as a user interface and an underside for engaging the directional-control unit,
wherein the corresponding primary locking element is protruding from the underside of the cap base and extending through the central opening of the interface frame structure to be in locking engagement with the primary locking element of the plate structure of the directional-control unit,
wherein the one or more corresponding secondary locking elements is at the cap base and in locking engagement with the one or more secondary locking elements of the interface frame structure,
wherein the two or more buttons of the discrete-directional-pad-cap are aligned to the two or more auxiliary openings of the interface frame structure,
wherein each of the two or more buttons comprise an abutment stud protruding from the underside the cap base, the abutment stud extending through a corresponding auxiliary opening of the interface frame structure to engage a corresponding plunger element of the directional-control unit,
wherein depressing any one or a combination of the two or more buttons individually urges a corresponding one or a combination of the two or more plunger elements to respectively slide relative to the plate structure into the extended positions, while the plate structure remain stationary with respect to the main support structure, to engage a corresponding one or a combination of the two or more switches.

11. The assembly as claimed in claim 8,
wherein the primary locking element and the corresponding primary locking element comprises a pair of magnets, a pair of a magnet and a metallic element, a pair of tongue and groove, a pair of pin and hole, a pair of snap fit interlocking elements, or a pair of twist and lock interlocking elements,
wherein each pair of the one or more secondary locking elements and the one or more corresponding secondary locking elements comprises a pair of magnets, a pair of a magnet and a metallic element, a pair of tongue and groove, a pair of pin and hole, a pair of snap fit interlocking elements, or a pair of twist and lock interlocking elements.

12. The assembly as claimed in claim 1,
wherein the plate structure of the directional-control unit comprises a centre support shaft protruding from the underside plate face and coaxial with the centre axis of the plate structure,
wherein the main support structure comprises a socket to receive the centre support shaft in a manner so as to insert the centre support shaft into the socket for supporting the centre of the plate structure.

13. The assembly as claimed in claim 12, further comprising two or more elastically deformable auxiliary support structures arranged around the main support structure in a manner so as to alternate with the two or more switches,
wherein the two or more elastically deformable auxiliary support structures abut the underside plate face of the plate structure of the directional-control unit so as to bias the plate structure in a neutral equilibrium un-tilted orientation with respect to the main support structure.

14. The assembly as claimed in claim 13, wherein the main support structure and the two or more elastically deformable auxiliary support structures are integrally moulded as a single membrane structure.

15. The assembly as claimed in claim 14, further comprising a membrane holder to hold the single membrane structure.

16. The assembly as claimed in claim 15, wherein the membrane holder and the single membrane structure are co-moulded as a single piece.

17. The assembly as claimed in claim 15, wherein the interface frame structure is fixedly coupled to the membrane holder.

18. The assembly as claimed in claim 17, further comprising one or more wall structures extending between the membrane holder and the interface frame structure to suspend the interface frame structure above the upper plate face of the plate structure of the directional-control unit.

19. The assembly as claimed in claim 1, further comprising two or more elastically deformable spacers respectively disposed between the two or more plunger elements and the two or more switches.

20. A handheld controller device comprising
a controller housing; and
a directional pad assembly comprising
an interface frame structure coupled to the controller housing in a manner so as to be non-movable relative to the controller housing, the interface frame structure being exposed from the controller housing, wherein the interface frame structure comprises
a plurality of frame members arranged to define a central opening and two or more auxiliary openings around the central opening,
a directional-control unit disposed below the interface frame structure, wherein the directional-control unit comprises
a plate structure having an upper plate face and an underside plate face with a centre axis extending perpendicularly through a centre of the plate structure, the upper plate face being directed towards the interface frame structure and the centre of the plate structure being aligned to the central opening of the interface frame structure, and two or more plunger elements distributed along a perimeter portion of the plate structure, each of the two or more plunger elements being slidable relative to the plate structure between a retracted position and an extended position along a sliding axis parallel to the centre axis of the plate structure, the two or more plunger elements being respectively aligned to the two or more auxiliary openings of the interface frame structure, a main support structure coupled to the controller housing in a manner so as to be non-movable relative to the controller housing, whereby the main support structure is in a fixed spatial relationship with the interface frame structure and non-movable relative to the interface frame structure, the main support structure being disposed below the directional-control unit, wherein the main support structure is in engagement with the underside plate face to support the centre of the plate structure in a manner such that the directional-control unit is multi-directional tiltable about the centre of the plate structure with respect to the main support structure two or more switches arranged around the main support structure, each switch of the two or more switches comprises an activation element directed towards the underside plate face of the plate structure of the directional-control unit, the two or more switches respectively aligned to the two or more plunger elements, wherein the directional-control unit is operable between a first mode and a second mode to activate the two or more switches, wherein, in the first mode, the plate structure of the directional-control unit is tiltable to urge at least one of the two or more plunger elements in the retracted position towards a corresponding one of the two or more switches for activating the switch, wherein, in the second mode, the plate structure of the directional-control unit is stationary with respect to the main support structure, and the two or more plunger elements are individually slidable relative to the plate structure into the extended positions to respectively activate the two or more switches.

21. A directional pad assembly comprising:

a directional-control unit having a plate structure having an upper plate face and an underside plate face with a centre axis extending perpendicularly through a centre of the plate structure, a primary locking element disposed at the centre of the plate structure, and two or more plunger elements distributed along a perimeter portion of the plate structure, each of the two or more plunger elements being slidable relative to the plate structure between a retracted position and an extended position along a sliding axis parallel to the centre axis of the plate structure;

a main support structure in engagement with the underside plate face to support the centre of the plate structure in a manner such that the directional-control unit is multi-directional tiltable about the centre of the plate structure with respect to the main support structure;

an interface frame structure suspended above the upper plate face of the plate structure of the directional-control unit in a manner so as to be in a fixed spatial relationship with the main support structure and non-movable relative to the main support structure, wherein the interface frame structure comprises a plurality of frame members arranged to define a central opening aligned to the centre of the plate structure of the directional-control unit and two or more auxiliary openings around the central opening, the two or more auxiliary openings respectively aligned to the two or more plunger elements of the directional-control unit, and one or more secondary locking elements around the central opening; and two or more switches arranged around the main support structure, each switch of the two or more switches comprises an activation element directed towards the underside plate face of the plate structure of the directional-control unit, the two or more switches respectively aligned to the two or more plunger elements, wherein the directional-control unit is selectively operable between a first mode and a second mode to activate the two or more switches by removably locking a swivel-directional-pad-cap or a discrete-directional-pad-cap to the directional-control unit, wherein, the directional-control unit is operable in the first mode with the swivel-directional-pad-cap removably locked to the plate structure of the directional-control unit, by a corresponding primary locking element disposed at a centre of the swivel-directional-pad-cap in locking engagement with the primary locking element of the plate structure of the directional-control unit, such that the swivel-directional-pad-cap and the plate structure of the directional-control unit are tiltable to urge at least one of the two or more plunger elements in the retracted position towards a corresponding one of the two or more switches for activating the switch, wherein, the directional-control unit is operable in the second mode with the discrete-directional-pad-cap removably locked to the plate structure of the directional-control unit and the interface frame structure, by a corresponding primary locking element disposed at a centre of the discrete-directional-pad-cap in locking engagement with the primary locking element of the plate structure of the directional-control unit, and one or more corresponding secondary locking elements around the primary locking element in locking engagement with the secondary locking element of the interface frame structure, such that the discrete-directional-pad-cap is removably locked to the plate structure of the directional-control unit and the interface frame structure to hold the plate structure of the directional-control unit stationary with respect to the main support structure, whereby the two or more plunger elements are individually slidable relative to the plate structure into the extended positions to respectively activate the two or more switches.

* * * * *